(12) United States Patent
Shull et al.

(10) Patent No.: US 7,732,539 B2
(45) Date of Patent: *Jun. 8, 2010

(54) MODIFIED ACRYLIC BLOCK COPOLYMERS FOR HYDROGELS AND PRESSURE SENSITIVE WET ADHESIVES

(75) Inventors: Kenneth R. Shull, Evanston, IL (US); Murat Guvendiren, Evanston, IL (US); Phillip B Messersmith, Clarendon Hills, IL (US); Bruce P Lee, Madison, WI (US)

(73) Assignee: National Science Foundation, Arlington, VA (US)

(*) Notice: Subject to any disclaimer, the term of this patent is extended or adjusted under 35 U.S.C. 154(b) by 196 days.

This patent is subject to a terminal disclaimer.

(21) Appl. No.: 11/676,099

(22) Filed: Feb. 16, 2007

(65) Prior Publication Data

US 2007/0208141 A1 Sep. 6, 2007

Related U.S. Application Data

(60) Provisional application No. 60/773,910, filed on Feb. 16, 2006.

(51) Int. Cl.
C08L 53/00 (2006.01)
C08F 297/02 (2006.01)

(52) U.S. Cl. .................................. 526/88; 525/242
(58) Field of Classification Search ................ 525/242, 525/88
See application file for complete search history.

(56) References Cited

U.S. PATENT DOCUMENTS

| | | | |
|---|---|---|---|
| 4,339,561 A | 7/1982 | Jacquet et al. |
| 4,496,397 A | 1/1985 | Waite |
| 4,585,585 A | 4/1986 | Waite |
| 4,615,697 A | 10/1986 | Robinson |
| 4,687,740 A | 8/1987 | Waite |
| 4,795,436 A | 1/1989 | Robinson |
| 4,808,702 A | 2/1989 | Waite |
| 4,908,404 A | 3/1990 | Benedict et al. |
| 4,978,336 A | 12/1990 | Capozzi et al. |
| 4,983,392 A | 1/1991 | Robinson |
| 5,015,677 A | 5/1991 | Benedict et al. |
| 5,024,933 A | 6/1991 | Yang et al. |
| 5,030,230 A | 7/1991 | White |
| 5,049,504 A | 9/1991 | Maugh et al. |
| 5,098,999 A | 3/1992 | Yamamoto et al. |
| 5,108,923 A | 4/1992 | Benedict et al. |
| 5,116,315 A | 5/1992 | Capozzi et al. |
| 5,156,956 A | 10/1992 | Motoki et al. |
| 5,192,316 A | 3/1993 | Ting |
| 5,197,973 A | 3/1993 | Pang et al. |
| 5,202,236 A | 4/1993 | Maugh et al. |
| 5,202,256 A | 4/1993 | Maugh et al. |
| 5,225,196 A | 7/1993 | Robinson |
| 5,242,808 A | 9/1993 | Maugh et al. |
| 5,260,194 A | 11/1993 | Olson |
| 5,374,431 A | 12/1994 | Pang et al. |
| 5,410,023 A | 4/1995 | Burzio |
| 5,428,014 A | 6/1995 | Labroo et al. |
| 5,487,739 A | 1/1996 | Aebischer et al. |
| 5,490,980 A | 2/1996 | Richardson et al. |
| 5,520,727 A | 5/1996 | Vreeland et al. |
| 5,525,336 A | 6/1996 | Green et al. |
| 5,549,904 A | 8/1996 | Juergensen et al. |
| 5,563,047 A | 10/1996 | Petersen |
| 5,574,134 A | 11/1996 | Waite |
| 5,580,697 A | 12/1996 | Keana et al. |
| 5,582,955 A | 12/1996 | Keana et al. |
| 5,605,938 A | 2/1997 | Roufa et al. |
| 5,618,551 A | 4/1997 | Tardy et al. |
| 5,628,793 A | 5/1997 | Zirm |
| 5,705,177 A | 1/1998 | Roufa et al. |
| 5,705,178 A | 1/1998 | Roufa et al. |
| 5,736,132 A | 4/1998 | Juergensen et al. |
| 5,776,747 A | 7/1998 | Schinstine et al. |
| 5,800,828 A | 9/1998 | Dionne et al. |
| 5,817,470 A | 10/1998 | Burzio et al. |
| 5,830,539 A | 11/1998 | Yan et al. |
| 5,834,232 A | 11/1998 | Bishop et al. |
| 5,858,747 A | 1/1999 | Schinstine et al. |
| 5,935,849 A | 8/1999 | Schinstine et al. |
| 5,939,385 A | 8/1999 | Labroo et al. |
| 5,955,096 A | 9/1999 | Santos et al. |
| 5,968,568 A | 10/1999 | Kuraishi et al. |

(Continued)

FOREIGN PATENT DOCUMENTS

DE    196 43 007 A1    4/1998

(Continued)

OTHER PUBLICATIONS

Yao et al. (Association behavior of poly(methyl methacrylate-b-methacrylic acid-b-methyl methacrylate) in aqueous medium), 2004, Polymer, vol. 45, pp. 2781-2791.*

(Continued)

*Primary Examiner*—David Wu
*Assistant Examiner*—Michael M Bernshteyn
(74) *Attorney, Agent, or Firm*—Quarles & Brady, LLP (57) ABSTRACT

A method of producing an acrylic block copolymer comprising hydrophobic poly (lower alkyl methacrylate), hydrophilic poly (lower alkyl methacrylic acid), and hydrophobic poly (lower alkyl methacrylate) is disclosed.

8 Claims, 7 Drawing Sheets

U.S. PATENT DOCUMENTS

| | | |
|---|---|---|
| 5,985,312 A | 11/1999 | Jacob et al. |
| 5,994,325 A | 11/1999 | Roufa et al. |
| 6,010,871 A | 1/2000 | Takahara et al. |
| 6,020,326 A | 2/2000 | Roufa et al. |
| 6,022,597 A | 2/2000 | Yan et al. |
| 6,083,930 A | 7/2000 | Roufa et al. |
| 6,093,686 A | 7/2000 | Nakada et al. |
| 6,129,761 A | 10/2000 | Hubbell |
| 6,150,461 A | 11/2000 | Takei et al. |
| 6,156,348 A | 12/2000 | Santos et al. |
| 6,162,903 A | 12/2000 | Trowern et al. |
| 6,235,313 B1 | 5/2001 | Mathiowitz et al. |
| 6,267,957 B1 | 7/2001 | Green et al. |
| 6,284,267 B1 | 9/2001 | Aneja |
| 6,294,187 B1 | 9/2001 | Boyce et al. |
| 6,306,993 B1 | 10/2001 | Rothbard et al. |
| 6,309,669 B1 | 10/2001 | Setterstrom et al. |
| 6,322,996 B1 | 11/2001 | Sato et al. |
| 6,325,951 B1 | 12/2001 | Soper et al. |
| 6,331,422 B1 | 12/2001 | Hubbell et al. |
| 6,335,430 B1 | 1/2002 | Qvist |
| 6,365,187 B2 | 4/2002 | Mathiowitz et al. |
| 6,368,586 B1 | 4/2002 | Jacob et al. |
| 6,417,173 B1 | 7/2002 | Roufa et al. |
| 6,486,213 B1 | 11/2002 | Chen et al. |
| 6,491,903 B1 | 12/2002 | Forster et al. |
| 6,497,729 B1 | 12/2002 | Moussy et al. |
| 6,506,577 B1 | 1/2003 | Deming et al. |
| 6,555,103 B2 | 4/2003 | Leukel et al. |
| 6,565,960 B2 | 5/2003 | Koob et al. |
| 6,566,074 B1 | 5/2003 | Goetinck |
| 6,566,406 B1 | 5/2003 | Pathak et al. |
| 6,635,274 B1 | 10/2003 | Masiz et al. |
| 6,663,883 B1 | 12/2003 | Akiyama et al. |
| 6,821,530 B2 | 11/2004 | Koob et al. |
| 6,887,845 B2 | 5/2005 | Barron et al. |
| 7,009,034 B2 | 3/2006 | Pathak et al. |
| 7,208,171 B2 | 4/2007 | Messersmith et al. |
| 7,300,991 B2 | 11/2007 | Nishimura et al. |
| 2001/0043940 A1 | 11/2001 | Boyce et al. |
| 2001/0049400 A1 | 12/2001 | Alli et al. |
| 2002/0022013 A1 | 2/2002 | Leukel et al. |
| 2002/0049290 A1 | 4/2002 | Vanderbilt |
| 2002/0182633 A1 | 12/2002 | Chen et al. |
| 2003/0009235 A1 | 1/2003 | Manrique et al. |
| 2003/0012734 A1 | 1/2003 | Pathak et al. |
| 2003/0039676 A1 | 2/2003 | Boyce et al. |
| 2003/0065060 A1 | 4/2003 | Qvist et al. |
| 2003/0069205 A1 | 4/2003 | Roufa et al. |
| 2003/0087338 A1 * | 5/2003 | Messersmith et al. ...... 435/68.1 |
| 2003/0099682 A1 | 5/2003 | Moussy et al. |
| 2003/0109587 A1 | 6/2003 | Mori |
| 2003/0208888 A1 | 11/2003 | Fearing et al. |
| 2004/0005421 A1 | 1/2004 | Gervase et al. |
| 2004/0028646 A1 | 2/2004 | Gross et al. |
| 2005/0032929 A1 | 2/2005 | Greener |
| 2005/0288398 A1 | 12/2005 | Messersmith et al. |
| 2006/0009550 A1 | 1/2006 | Messersmith et al. |

FOREIGN PATENT DOCUMENTS

| | | |
|---|---|---|
| WO | WO 88/03953 | 6/1988 |
| WO | WO 92/10567 | 6/1992 |
| WO | WO 94/28937 | 12/1994 |
| WO | WO 97/34016 | 9/1997 |
| WO | WO 98/07076 | 2/1998 |
| WO | WO 01/44401 A1 | 6/2001 |
| WO | WO 02/34764 A1 | 5/2002 |
| WO | WO 03/008376 A2 | 1/2003 |
| WO | WO 03/080137 A1 | 10/2003 |
| WO | WO 2004/042068 A2 | 5/2004 |
| WO | WO2005/033198 A1 * | 4/2005 |

OTHER PUBLICATIONS

Yao et al. "Association behavior of poly(methyl methacrylate-b-methacrylic acid-b-methyl methacrylate) in aqueous medium", 2004, Polymer, vol. 45, pp. 2781-2791.*

Statz et al. "New Peptidomimetic Polymers for Antifouling Surfaces", JACS Communications, J.Am. Chem.Soc. 2005, 127, 7972-7973.*

N. Hadjichristidis et al. "Block copolymers. Synthetic Strategies, Physical Properties, and Applications", A John Wiley & Sons, Inc. 2003, pp. 14-17 and 116-117.*

Crosby A.J., et al., J. Rheology, 2002, 46, 273.

Dai, S, Ravi, P., Tam, K.C., Mao. B.W., and Gan, L.H., Langmuir, 2003, 19, 5175-5177.

Deming, T. J., "Mussel byssus and biomolecular materials", Current Opinion in Chemical Biology 1999, 3, 100-5.

Guvendiren, Murat, Lee, Bruce P., Messersmith, Phillip B., Shull, Kenneth R., "Synthesis and adhesion properties of DOPA incorporated acrylic triblock hydrogels," Proceedings of the Annual Meeting of the Adhesion Society (2006), 29th 277-279.

Guvendiren, Murat, Messersmith, Phillip B., Shull, Kenneth R., "Adhesion in Self-Assembled Hydrogels with High DOPA Content," Proceedings of the Annual Meeting of the Adhesion Society (2007), 30th.

Hansen, D. C., Corcoran, S. G., and Waite, J. H.,"Enzymatic tempering of a mussel adhesive protein film", Langmuir 1998, 14, 1139-47.

Huang, K., Lee, B., and Messersmith, P. B., "Synthesis and characterization of self-assembling block copolymers containing adhesive moieties", Polym. Prepr. (Am. Chem. Soc., Div. Polym. Chem.) 2001, 42, 147-8.

Lee, B.P., Chao, C.-Y, Nunalee, F.N., Motan, E., Shull, K.R., and Messersmith, P.B., Macromolecules, 2006, 39, 1740-1748.

Lee, B.P., Dalsin, J.L., and Messersmith, P.B., Biomacromolecules, 2002, 3, 1038-1047.

Lee, B. P., Dalsin, J. L., and Messersmith, P. B., "Enzymatic and non-enzymatic pathways to formation of DOPA-modified PEG hydrogels", Polym. Prepr. (Am. Chem. Soc., Div. Polym. Chem.) 2001, 42, 151-2.

Lee, B. P., Huang, K., Nunalee, N., Shull, K. R., and Messersmith, P. B.,"Synthesis of 3,4-dihydroxyphenylalanine (DOPA) containing monomers and their co-polymerization with PEG-diacrylate to form hydrogels", J. Biomater. Sci. Polymer Ed. 2004, 15, 449-64.

Papov, V. V., Diamond, T. V., Biemann, K., and Waite, J. H., "Hydroxyarginine-Containing Polyphenolic Proteins in the Adhesive Plaques of the Marine Mussel Mytilus-Edulis", J. Biol. Chem. 1995, 270, 20183-92.

Rozier, A, Mazuel, C, Grove, J., and Plazonnet, B., International Journal of Pharmaceutics, 1989, 57, 163-168.

Ruel-Gariepy, E. and Leroux, J.-C., European Journal of Pharmaceutics and Biopharmaceutics, 2004, 58, 409-426.

Rzepecki, L. M. and Waite, J. H., "Wresting the muscle from mussel beards: Research and applications", Mol. Mar. Biol. Biotechnol. 1995, 4, 313-22.

Rzepecki, L. M.,Nagafuchi, T., and Waite, J. H.,"Alpha, Beta-Dehydro-3,4-Dihydroxyphenylalanine Derivatives—Potential Schlerotization Intermediates in Natural Composite- Materials", Arch. Biochem. Biophys. 1991, 285, 17-26.

Saby, C. and Luong, J. H. T., "Mytilus edulis adhesive protein (MAP) as an enzyme immobilization matrix in the fabrication of enzyme-based electrodes", Electroanalysis 1998, 10, 1193-9.

Shull K.R., Mat.Sci.Eng., 2002, R36, 1-45.

Tae G., Kornfield J.A., Hubbel J.A., Biomaterials, 2005, 26, 5259-5266.

Waite, J. H., in Redox-Active Amino Acids in Biology, 1995, vol. 258, p. 1-20.

Warner, S. C. and Waite, J. H.,"Expression of multiple forms of an adhesive plaque protein in an individual mussel, Mytilus edulis", Mar. Biol. 1999, 134, 729-34.

Webber R.E., et al., Physical Review E, 2003, 68, 021805.

Yu, M. E. and Deming, T. J.,"Synthetic polypeptide mimics of marine adhesives", Macromolecules 1998, 31, 4739-45.

Yu M., Hwang J., and Deming T.J., J.Am Chem. Soc, 1999, 121, 5825-5826.

Dalsin et al., Bioinspired Antifouling Polymers. Materials Today 2005, 8, 9 (38-46).

Gristina, Biomaterial-Centered Infection—Microbial Adhesion Versus Tissue Integration. Science 1987, 237, (4822), 1588-1595.

Evans et al., Iron Chelator, Exopolysaccharide and Protease Production in Staphylococcus-Epidermidis—a Comparative-Study of the Effects of Specific Growth-Rate in Biofilm and Planktonic Culture. Microbiology-Uk 1994, 140, 153-157.

Yu et al., Adhesion of Coagulase-Negative Staphylococci and Adsorption of Plasma-Proteins to Heparinized Polymer Surfaces. Biomaterials 1994,15, (10), 805-814.

Jose et al., Vancomycin covalently bonded to titanium beads kills *Staphylococcus aureus*. Chemistry & Biology 2005, 12, (9), 1041-1048.

Desai et al., Surface-Immobilized Polyethylene Oxide for Bacterial Repellence. Biomaterials 1992, 13, (7), 417-420.

Burdinski et al., Universal Ink for Microcontact Printing. Angwandte Chemie 2006, 45, 1-5.

Floriolli et al., Marine surfaces and the expression of specific byssal adhesive protein variants in Mytilus. Mar Biotechnol 2000, 2, 352-363.

Bain et al., Molecular-level Control over Surface Order in Self-Assembled Monolayer Films of Thiols on Gold. Science 1988, 240, (4848), 62-63.

Waite, Reverse engineering of bioadhesion in marine mussels. Bioartificial Organs ii: Technology, Medicine, and Materials 1999, 875, 301-309.

Pasche et al., Poly(l-lysine)-graft-poly(ethylene glycol) assembled monolayers on niobium oxide surfaces: A quantitative study of the influence of polymer interfacial architecture on resistance to protein adsorption by ToF-SIMS and in situ OWLS. Langmuir 2003,19, (22), 9216-9225.

Zhang et al., Reactive coupling of poly(ethylene glycol) on electroactive polyaniline films for reduction in protein adsorption and platelet adhesion. Biomaterials 2002, 23, (3), 787-795.

Holl et al., Solid-State NMR Analysis of Cross-Linking in Mussel Protein Glue. Archives of Biochemistry and Biophysics 1993, 302, (1),255-258.

International Search Report, PCT/US2008/050721.

Advincula, "Surface Initiated Polymerization from Nanoparticle Surfaces," *J. Dispersion Sci. Technol.*, vol. 24, Nos. 3 & 4 (2003), pp. 343-361.

Ahmed, et al., "Synthesis and Application of Fluorescein-Labeled Pluronic Block Copolymers to the Study of Polymer-Surface Interactions," *Langmuir*, vol. 17, No. 2 (2001), pp. 537-546.

Alexandridis, P.; Nivaggioli, T.; Hatton, T. A., "Temperature Effects on Structural Properties of Pluronic P104 and F108 PEO-PPO-PEO Block Copolymer Solutions," *Langmuir*, vol. 11, No. 5 (1995), pp. 1468-1476.

Alexandridis, P., "Poly(ethylene oxide)-Poly(propylene oxide) Block Copolymer Surfactants," *Curr. Opin. Colloid Interface Sci.*, vol. 2, No. 5 (1997), pp. 478-489.

Alivisatos, P., "The use of nanocrystals in biological detection," *Nature Biotechnology*, vol. 22, No. 1 (2004), pp. 47-52.

Alleyne, Jr., et al., "Efficacy and biocompatibility of a photopolymerized, synthetic, absorbable hydrogel as a dural sealant in a canine craniotomy model," *J. Neurosurg.*, vol. 88 (1998), pp. 308-313.

Andreopoulos, et al., "Light-induced tailoring of PEG-hydrogel properties," *Biomaterials*, vol. 19 (1998), pp. 1343-1352.

Andrzejewska, et al., "The role of oxygen in camphorquinone-initiated photopolymerization," *Macromol. Chem. Phys.*, vol. 199 (1998), pp. 441-449.

Araujo, et al., "Interaction of Catechol and Gallic Acid with Titanium Dioxide in Aqueous Suspensions. 1. Equilibrium Studies," *Langmuir*, vol. 21 (2005), pp. 3470-3474.

Armstrong et al., "Scanning Microcalorimetric Investigations of Phase Transitions in Dilute Aqueous Solutions of Poly(oxypropylene)," *J. Phys. Chem.*, vol. 99 (1995), pp. 4590-4598.

Arnow, "Colorimetric Determination of the Component of 3, 4-Dihydroxyphemylalanine-Tyrosine Mixtures," *J. Biol. Chem.*, vol. 118 (1937), pp. 531-538.

Arzt et al., "From micro to nano contacts in biological attachment devices," *Proc. Nat. Acad. Sci. USA*, vol. 100 (2003), pp. 10603-10606.

Arzt, "Biological and artificial attachment devices: Lessons for materials scientists from flies and geckos," *Mater. Sci. Eng. C*, vol. 26 (2006), pp. 1245-1250.

Autumn et al., "Adhesive force of a single gecko foot-hair," *Nature*, vol. 405 (2000), pp. 681-685.

Autumn et al., "Evidence for van der Waals adhesion in *Gecko setae*," *Proc. Nat. Acad. Sci. USA*, vol. 99 (2002), pp. 12252-12256.

Baird, et al. (2007), "Reduction of Incisional Cerebrospinal Fluid Leak Following Posterior Foss Surgery with the use of Duraseal," American Association of Neurosurgeons. Abstract retrieved Jul. 23, 2008, from AANS Abstract Center database. Available from: http://www.aans.org/library/article.aspx?ArticleId=42392.

Balsa-Canto, et al., "Reduced-Order Models for Nonlinear Distributed Process Systems and Their Application in Dynamic Optimization," *Ind. Eng. Chem. Res.*, vol. 43 (2004), pp. 3353-3363.

Banerjee, et al., "Derivatives of 3, 4-Dihydroxyphenylalanine for Peptide Synthesis," *J. Org. Chem.*, vol. 41, No. 18 (1976), pp. 3056-3058.

Barbakadze, et al., "Poly[3-(3, 4-dihydroxyphenyl)glyceric Acid], A New Biologically Active Polymer from *Symphytum asperum lepech*. and *S. caucasicum bieb*. (Boraginaceae)," *Molecules*, vol. 10 (2005), pp. 1135-1144.

Barichello et al., "Absorption of insulin from Pluronic F-127 gels following subcutaneous administration in rats," *Int. J. Pharm.*, vol. 184 (1999), pp. 189-198.

Benedek, "End Uses of Pressure-Sensitive Products" in *Developments in Pressure-Sensitive Products*, Benedek (ed.), CRC Press: Boca Raton, FL (2006). pp. 539-596.

Bharathi, et al., "Direct synthesis of gold nanodispersions in sol-gel derived silicate sols, gels and films," *Chem. Commun.* (1997), pp. 2303-2304.

Bontempo, et al., "Atom Transfer Radical Polymerization as a Tool for Surface Functionalization," *Adv. Mater.*, vol. 14, No. 17 (2002), pp. 1239-1241.

Boogaarts, et al., "Use of a novel absorbable hydrogel for augmentation of dural repair: results of a preliminary clinical study," *Neurosurg.*, vol. 57 (2005), pp. 146-151.

Bromberg, "Novel Family of Thermogelling Materials via C—C Bonding between Poly(acrylic acid) and Poly(ethylene oxide)-*b*poly(propylene oxide)-*b*-poly(ethylene oxide)," *J. Phys. Chem. B*, vol. 102 (1998), pp. 1956-1963.

Bromberg, "Self-Assembly in Aqueous Solutions of Polyether-Modified Poly(acrylic acid)," *Langmuir*, vol. 14 (1998), pp. 5806-5812.

Bromberg, "Temperature-responsive gels and thermogelling polymer matrices for protein and peptide delivery," *Advanced Drug Reviews*, vol. 31 (1998), pp. 197-221.

Brown, et al., "Micelle and Gel Formation in a Poly(ethylene oxide)/Poly(propylene.oxide)/Poly(ethylene oxide) Triblock Copolymer in Water Solution. Dynamic and Static Light Scattering and Oscillatory Shear Measurements," *J. Phys. Chem.*, vol. 95 (1991), pp. 1850-1858.

Bruinsma, et al., "Bacterial adhesion to surface hydrophilic and hydrophobic contact lenses," *Biomaterials*, vol. 22 (2001), pp. 3217-3224.

Bryant, et al., "Cytocompatibility of UV and visible light photoinitiating systems on cultured NIH/3T3 fobroblasts in vitro," *J. Biomater. Sci. Polymer Edn*, vol. 11, No. 5 (2000), pp. 439-457.

Burdick, et al., "Synthesis and Characterization of Tetrafunctional Lactic Acid Oligomers: A potential in Situ Forming Degradable Orthopaedic Biomaterial," *J. Polym. Sci., Part A: Polym. Chem.*, vol. 39 (2001), pp. 683-692.

Burzio, et al., "Cross-Linking in Adhesive Quinoproteins: Studies with Model Decapeptides," *Biochemistry*, vol. 39 (2000), pp. 11147-11153.

Cabana, et al., "Study of the Gelation Process of Polyethylene Oxide$_a$—Polyethylene Oxide$_b$—Polyethylene Oxide$_a$ Copolymer (Poloxamer 407) Aqueous Solutions," *J. Colloid Interface Sci.*, vol. 190 (1997), pp. 307-312.

Campbell, et al., "Evaluation of Absorbable Surgical Sealants: In vitro Testing," Confluent Surgical, Inc. (2005) White Paper. Available from: http://www.confluentsurgical.com/pdf/ds/6070_DuraSeal_Invitro_WP13-25.pdf.

Carmichael, et al., "Selective Electroless Metal Deposition Using Microcontact Printing of Phosphine—Phosophonic Acid Inks," *Langmuir*, vol. 20 (2004), pp. 5593-5598.

Chalykh, et al., "Pressure-Sensitive Adhestion in the Blends of Poly(N-vinyl pyrrolidone) and Poly(ethylene glycol) of Disparate Chain Lengths," *J. of Adhes.*, vol. 78 (2002), pp. 667-694.

Chehimi, et al., "XPS investigations of acid-base interactions in adhesion. Part 3. Evidence for orientation of carbonyl groups from poly(methylmethacrylate) (PMMA) at the PMMA—glass and PMMA—Si0$_2$ interfaces," *J. Electron. Spectrosc. Relat. Phenom.*, vol. 63 (1993), pp. 393-407.

Chen, et al., "Temperature-Induced Gelation Pluronic-g-Poly(acrylic acid) Graft Copolymers for Prolonged Drug Delivery to the Eye," in Harris, et al. (eds.) *Poly(ethylene glycol): Chemistry and Biological Applications*. New York, NY: Oxford University Press USA, 1997. pp. 441-451.

Chen, et al., "Enzymatic Methods for in Situ Cell Entrapment and Cell Release," *Biomacromolecules*, vol. 4 (2003), pp. 1558-1563.

Collier, et al., "Enzymatic Modification of Self-Assembled Peptide Structures with Tissue Transglutaminase," *Bioconjugate Chem.*, vol. 14 (2003), pp. 748-755.

Collier, et al., "Self-Assembling Polymer-Peptide Conjugates: Nanostructural Tailoring," *Adv. Mater.*, vol. 16, No. 11 (2004), pp. 907-910.

Collins, et al., "Use of collagen film as a dural substitute: Preliminary animal studies," *J. Biomed. Mater. Res.*, vol. 25 (1991), pp. 267-276.

Connor, et al., "New Sol—Gel Attenuated Total Reflection Infrared Spectroscopic Method for Analysis of Adsorption at Metal Oxide Surfaces in Aqueous Solutions. Chelation of TiO$_2$, ZrO$_2$, and Al$_2$O$_3$ Surfaces by Catechol, 8-Quinolinol, and Acetylacetone," *Langmuir*, vol. 11 (1995), pp. 4193-4195.

Cosgrove, et al., "Safety and efficacy of a novel polyethylene glycol hydrogel sealant for watertight dural repair," *J. Neurosurg.*, vol. 106 (2007), pp. 52-58.

Cosgrove, "Safety and Efficacy of a Novel PET Hydrogel Sealant (DuraSeal®) for Watertight Closure after Dural Repair," Presented at the Congress of Neurological Surgeons 55th Annual Meeting, Boston, MA, Oct. 2005. Available from: http://www.confluentsurgical.com/pdf/ds/CosgroveAbstractCNS2005.pdf.

Crescenzi, et al., "New Gelatin-Based Hydrogels via Enzymatic Networking," *Biomacromolecules*, vol. 3 (2002), pp. 1384-1391.

Creton, "Pressure-Sensitive Adhesives: An Introductory Course," *MRS Bulletin*, vol. 26, No. 6 (2003), pp. 434-439.

Crosby, et al., "Controlling Polymer Adhesion with "Pancakes"," *Langmuir*, vol. 21 (2005), pp. 11738-11743.

Cruise, et al., "A Sensitivity Study of the Key Parameters in the Interfacial Photopolymerization of Poly(etheylene glycol) Dlacrylate upon Porcine Islets," *Biotechnol. Bioeng.*, vol. 57, Issue 6 (1998), pp. 655-665.

Dalsin, et al., "Surface Modification for Protein Resistance Using a Biomimetic Approach," *Mat. Res. Soc. Symp. Proc.*, vol. 774 (2002), pp. 75-80.

Dalsin, et al., "Mussel Adhesive Protein Mimetic Polymers for the Preparation of Nonfouling Surfaces," *J. Am. Chem. Soc.* 125 (2003). pp. 4253-4258.

Dalsin, et al., "Antifouling Performance of Poly(ethylene glycol) Anchored onto Surfaces by Mussel Adhesive Protein Mimetic Peptides," *Polymeric Materials Science and Engineering* 90 (2004). pp. 247-248.

Dalsin, et al., "Protein Resistance of Titanium Oxide Surfaces Modified by Biologically Inspired mPEG—DOPA," *Langmuir* 21 (2005). pp. 640-646.

Davis, et al., "Polymeric microspheres as drug carriers," *Biomaterials* 9 (1), 1988. pp. 111-115.

Deible, et al., "Creating molecular barriers to acute platelet deposition on damaged arteries with reactive polyethylene glycol," *J. Biomed. Maters. Res.* 41 (1998). pp. 251-256.

Deming, et al., "Mechanistic Studies of Adhesion and Crosslinking in Marine Adhesive Protein Analogs," *Polym. Mater. Sci. Eng.*, 80 (1999). pp. 471-472.

Deruelle, et al., "Adhesion at the Solid—Elastomer Interface: Influence of the Interfacial Chains," *Macromolecules*, vol. 28 (1995), pp. 7419-7428.

Desai, et al., "In Vitro Evaluation of Pluronic F127-Based Controlled-Release Ocular Delivery Systems for Polocarpine," *J. Phar. Sci.*, 87 (2), 1998. pp. 226-230.

Dillow, et al., "Adhesion of $\alpha_5\beta_1$ receptors to biomimetic substrates constructed from peptide amphiphiles," *Biomaterials*, vol. 22 (2001), pp. 1493-1505.

Dunkerwolcke, et al., "Tissue and bone adhesives—historical aspects," *Biomaterials* 19 (1998). pp. 1461-1466.

Dossot, et al., "Role of Phenolic Derivatives in Photopolymerization of an Acrylate Coating," *J. Appl. Polymer. Sci.*, 78 (2000). pp. 2061-2074.

Drumheller, et al., "Polymer Networks with Grafted Cell Adhesion Peptides for Highly Biospecific Cell Adhesive Substrates," *Anal. Biochem.*, vol. 222 (1994), pp. 380-388.

Elbert, et al., "Reduction of fibrous adhesion formation by a copolymer possessing an affinity for anionic surfaces," *J. Biomed. Mater. Res.*, vol. 42, Issue 1 (1998), pp. 55-65.

Elisseeff, et al., "Photoencapsulation of chondrocytes in poly(ethylene oxide)-based semi-interpenetrating networks," *J. Biomed. Mater. Res.*, vol. 51, Issue 2 (2000), pp. 164-171.

Erli, et al., "Surface pretreatments for medical application of adhesion," *BioMed. Eng. Online*, 2 (15), 2003. Available from: http://www.biomedical-engineering-online.com/content/2/2/15.

Fan et al., "Surface-Initiated Polymerization from TiO$_2$ Nanoparticle Surfaces through a Biomimetic Initiator: A New Route toward Polymer-Matrix Composites," *Comp. Sci. Tech.*, 66 (9), 2006. pp. 1195-1201.

Fang, et al., "Effect of Molecular Structure on the Adsorption of Protein on Surfaces with Grafted Polymers," *Langmuir*, vol. 18 (2002), pp. 5497-5510.

Faulkner, et al., "A New Stable Pluronic F68 Gel Carrier for Antibiotics in Contaminated Wound Treatment," *Am. J. Emerg. Med.*, 15 (1), 1997. pp. 20-24.

Feldstein, et al., "Molecular Design of Hydrophilic Pressure-Sensitive Adhesives for Medical Applications," in *Developments in Pressure-Sensitive Products*, I. Benedek (ed.). 2006, CRC Press: Boca Raton, FL. pp. 473-503.

Filpula, et al., "Structural and Functional Repetition in a Marine Mussel Adhesive Protein," *Biotechnol. Prog.* 6 (1990). pp. 171-177.

Fischer, et al., "In vitro cytotoxicity testing of polycations: influence of polymer structure on cell viability and hemolysis," *Biomaterials* 24 (2003). pp. 1121-1131.

Flanigan, et al., "Adhesive and Elastic Properties of Thin Gel Layers," *Langmuir*, vol. 15 (1999), pp. 4966-4974.

Flanigan, et al., "Structural Development and Adhesion of Acrylic ABA Triblock Copolymer Gels," *Macromolecules*, vol. 32 (1999), pp. 7251-7262.

Flood, et al., "Efficient Asymmetric Epoxidation of $\alpha,\beta$-Unstarudated Ketones Using a Soluble Triblock Polyethylene Glycol-Polyamino Acid Catalyst," *Org. Lett.*, vol. 3, No. 5 (2001), pp. 683-686.

Floudas, et al., "Hierarchical Self-Assembly of Poly($\gamma$-benzyl-L-glutamate)—Poly(ethylene glycol)—Poly($\gamma$-benzyl-L-glutamate) Rod—Coil—Rod Triblock Copolymers," *Macromolecules*, vol. 36 (2003), pp. 3673-3683.

Flory, et al., "Effect of Volume Exclusion on the Dimensions of Polymer Chains," *J. Chem. Phys.*, vol. 44, No. 6 (1966), pp. 2243-2248.

Floyd-Smith, et al., "Interferon Action: RNA Cleavage Pattern of a (2'-5')Oligoadenylate-Dependent Endonuclease," *Science*, vol. 212, No. 4498 (May 29, 1981), pp. 1030-1032.

Frank, et al., "Adhesion of *Mytilus edulis* Foot Protein 1 on Silica: Ionic Effects on Biofouling," *Biotechnol. Prog.* 18 (2002). pp. 580-586.

Fuchsbauer, et al., "Influence of gelatin matrices cross-linked with transglutaminase on the properties of an enclosed bioactive material using β-galactosidase as model system," *Biomaterials* 17 (1996). pp. 1481-1488.

Fujisawa, et al., "Kinetic Evaluations of the Reactivity of Flavonoids as Radical Scavengers," *SAR QSAR Environ. Res.*, Vo. 13, No. 6 (2002), pp. 617-627.

Fuller, et al., "A Procedure for the Facile Synthesis of Amino-Acid N-Carboxyanhydrides," *Biopolymers* 15 (1976). pp. 1869-1871.

Fuller, et al., "DOPA-Containing Polypeptides. I. Improved Synthesis of High-Molecular—Weight Poly (L-DOPA) and Water-Soluble Copolypeptides," *Biopolymers* 17 (1978). pp. 2939-2943.

Geim, et al., "Microfabricated adhesive mimicking gecko foot-hair," *Nat. Materials* 2 (2003). pp. 461-463.

Ghosh, et al., "N,N'-Disuccinimidyl Carbonate: A Useful Reagent for Alkoxycarbonylation of Amines," *Tetra. Lett.* 33 (20), 1992. pp. 2781-2784.

Gidanian, et al., "Redox behavior of melanins: direct electrochemistry of dihydroxyindole-melanin and its Cu and Zn adducts," *J. Inorg. Biochem.* 89 (2002). pp. 54-60.

Green, et al., "A surface plasmon resonance study of albumin adssoption to PEO-PPO-PEO triblock copolymers," *J. Biomed. Res.* 42 (1998). pp. 165-171.

Gross, et al., "Amine Bindindg Sites in Acyl Intermediates of Transglutaminases," *J. Biol. Chem.* 242 (11) (1977). pp. 3752-3759.

Grotenhuis, et al,. "Synthetic Dural Sealant for Prevention of Postoperative CSF Leakage," Presented at the American Association of Neurological Surgeons; Apr. 2003, San Diego, CA. Available from: http://www.confluentsurgical.com/pdf/ds/AbstractGrotenhuisAbstract.pdf.

Grotenhuis, et al., "A Novel Absorbable Hydrogel for Dural Repair: Results of a Pilot Clinical Study," Confluent Surgical, Inc. (2005) White Paper. Available from: http://www.confluentsurgical.com/pdf/ds/DuraSeal_Pilot_Study_WP4-7-05.pdf.

Grotenhuis, "Costs of postoperative cerebrospinal fluid leakage: 1-year, retrospective analysis of 412 consecutive nontrauma cases," *Surg. Neurol.*, vol. 64, No. 6 (2005), pp. 493-494.

Gu, et al., "Synthesis of Aluminum Oxide/Gradient Copolymer Composites by Atom Transfer Radical Polymerization," *Macromolecules* 35 (2002). pp. 8913-8916.

Gu, et al., "The role of microbial biofilms in deterioration of space station candidate materials," *Int. Biodeterioration Biodegradation* 41 (1998). pp. 25-33.

Haemers, et al., "Effect of Oxidation Rate on Cross-Linking of Mussel Adhesive Proteins," *Biomacromolecules*, vol. 4 (2003), pp. 632-640.

Hajjaji, et al., "Effect of N-Alkybetaines on the Corrosion of Iron in 1 M HCl Solution," *Corrosion*, vol. 49, No. 4 (1993), pp. 326-334.

Hanawa, et al., "XPS Characterization of the Surface Oxide Film of 316L Stainless Steel Samples that were Located in Quasi-Biological Environments," *Mater. Trans., JIM*, vol. 43, No. 12 (2002), pp. 3088-3092.

Harris, "Laboratory Synthesis of Polyethylene Glycol Derivatives," *JMS—Rev. Macromol. Chem. Phys.*, vol. C25, No. 3 (1985), pp. 325-373.

Harris (ed.), "Introduction to Biotechnical and Biomedical Applications of Poly(Ethylene Glycol)" in *Poly(Ethylene Glycol) Chemistry: Biotechnical and Biomedical Applications*, Plenum Press: New York, 1992. pp. 1-14.

Hennink, et al., "Novel crosslinking methods to design hydrogels," *Adv. Drug Deliver. Rev.*, vol. 54 (2002), pp. 13-36.

Hern, et al., "Incorporation of adhesion peptides into nonadhesive hydrogels useful for tissue resurfacing," *J. Biomed. Mater. Res.*, vol. 39, Issue 2 (1998), pp. 266-276.

Hillery, et al., "The effect of adsorbed poloxamer 188 and 407 surfactants on the intestinal uptake of 60-nm polystyrene particles after oral administratin in the rat," *Int. J. Pharm.* 132 (1996). pp. 123-130.

Ho, et al., "Nanoseparated Polymeric Networks with Multiple Antimicrobial Properties," *Adv. Mater.* 16 (12), 2004. pp. 957-961.

Hoffman, "Hydrogels for biomedical applications," *Adv. Drug Deliver. Rev.*, vol. 43 (2002), pp. 3-12.

Hohenadl, et al., "Two Adjacent N-terminal Glutamines of BM-40 (Osteonectin, SPARC) Act as Amine Acceptor Sites in Transglutaminase$_c$-catalyzed Modification," *J. Biol. Chem.* 270 (40), 1995. pp. 23415-23420.

Hrkach, et al., "Synthesis of Poly(L-lactic acid-*co*-L-lysine) Graft Copolymers," *Macromolecules*, vol. 28 (1995), pp. 4736-4739.

Hu, et al., "Protection of 3,4-dihydroxyphenylalanine (DOPA) for Fmoc solid-phase peptide synthesis," *Tetra. Lett.* 41 (2000). pp. 5795-5798.

Hu, et al., "Rational Design of Transglutaminase Substrate Peptides for Rapid Enzymatic Formation of Hydrogels," *J. Am. Chem. Soc.*, vol. 125, (2003), pp. 14298-14299.

Huang, et al., "Synthesis and Characterization of Self-Assembling Block Copolymers Containing Bioadhesive End Groups," *Biomacromolecules* 3 (2002). pp. 397-406.

Huang, et al., "Covalent Attachment of Novel Poly(ethylene glycol)—Poly(DL-lactic acid) Copolymeric Micelles to $TiO_2$ Surfaces," *Langmuir* 18 (2002). pp. 252-258.

Huang, et al., "Functionalization of Surfaces by Water-Accelerated Atom-Transfer Radical Polymerization of Hydroxyethyl Methacrylate and Subsequent Derivatization," *Macromolecules* 35 (2002). pp. 1175-1179.

Huang, et al., "Poly(L-lysine)-*g*-poly(ethylene glycol) Layers on Metal Oxide Surfaces: Surface-Analytical Characterization and Resistance to Serum and Fibrinogen Adsorption," *Langmuir*, vol. 17 (2001), pp. 489-498.

Huang, "Molecular aspects of muco- and bioadhesion: Tethered structures and site-specific surfaces," *J. Controlled Release*, vol. 65 (2000), pp. 63-71.

Huber, et al., "Resolving the nanoscale adhesion of individual *Gecko spatulae* by atomic force microscopy," *Biol. Lett.* 1 (2005). pp. 2-4.

Huber, et al., "Evidence for capillarity contributions to gecko adhesion from single spatula nanomechanical measurements," *Proc. Nat. Acad. Sci. USA*, 102 (45), 2005. pp. 16293-16296.

Huin-Amargier, et al., "New physically and chemically crosslinked hyaluronate (HA)-based hydrogels for cartilage repair," *J. Biomed. Mater. Res.* 76A (2), 2006. pp. 416-424.

Hunter, "Molecular hurdles in polyfectin design and mechanistic background to polycation inducted cytotoxicity," *Adv. Drug Deliver. Rev.*, vol. 58 (2006). pp. 1523-1531.

Hutter, et al., "Calibration of atomic-force microscope tips," *Rev. Sci. Instrum.* 64 (7), Jul. 1993. pp. 1868-1873.

Hvidt, et al., "Micellization and Gelation of Aqueous Solutions of a Triblock Copolymer Studied by Rheological Techniques and Scanning Calorimetry," *J. Phys. Chem.* 98 (1994). pp. 12320-12328.

Hwang, et al., "Expression of Functional Recombinant Mussel Adhesive Protein Mgfp-5 in *Escherichia coli*," *Appl. Environ. Microbiol.* 70 (6), 2004. pp. 3352-3359.

Ikada, "Tissue Adhesives," in *Wound Closure Biomaterials and Devices*, Chu, et al. (eds.), CRC Press, Inc.: Boca Raton, FL, 1997. pp. 317-346.

International Search Report for PCT/US2003/034633; WO 2004/042068 A3 (May 21, 2005); Northwestern University (Applicant); Messersmith, et al. (inventors).

International Search Report for PCT/US2005/006418; WO 2005/118831 A3 (Dec. 15, 2005); Northwestern University (Applicant); Messersmith, et al. (inventors).

International Search Report for PCT/US2005/024642; WO 2006/091226 A3 (Aug. 31, 2006); Northwestern University (Applicant); Messersmith, et al. (inventors).

International Search Report for PCT/US2005/041280; WO 2006/055531 A3 (May 26, 2006); Northwestern University (Applicant); Messersmith, et al. (Inventors).

International Search Report for PCT/US2007/075299; WO 2008/019352 A3 (Feb. 14, 2008); Nerites Corporation (Applicant); Lee (Inventor).

International Search Report for PCT/US2002/23005; WO 03/008376 A3 (Jan. 30, 2003); Northwestern University (Applicant); Messersmith, et al. (inventors).

Ishihara, et al., "Photocrosslinkable chitosan as a dressing wound occlusion and accelerator in healing process," *Biomaterials*, vol. 23, No. 3 (2002), pp. 833-840.

Jackson, "Tissue sealants: Current status, future potential," *Nat. Med.*, vol. 2, No. 5, (May 1996), pp. 637-638.

Jackson, "Fibrin sealants in surgical practice: An overview," *Am. J. Surg.*, vol. 182 (2001), pp. 1S-7S.

Jänchen, et al., "Adhesion Energy of Thin Collagen Coatings and Titanium," *Surf. Interface Anal.*, vol. 27 (1999), pp. 444-449.

Jensen, et al., "Lipopeptides Incorporated into Supported Phospholipid Monolayers Have High Specific Activity at Low Incorporation Levels," *J. Am. Chem. Soc.*, vol. 126, No. 46 (2004), pp. 15223-15230.

Jeon, et al., "Protein-Surface Interactions in the Presence of Polyethylene Oxide," *J. Colloid. Interface Sci.*, vol. 142, No. 1 (1991), pp. 159-166.

Jewell, et al., "Pharmacokinetics of RheothRx Injection in Healthy Male Volunteers," *J. Phar. Sci.* vol. 86, No. 7 (1997), pp. 808-812.

Jo, et al., "Surface modification using silanated poly(ethylene glycol)s," *Biomaterials*, vol. 21 (2000), pp. 605-616.

Johnson, et al., "Surface Energy and Contact of Elastic Solids," *Proc. R. Soc. Lond., A*, vol. 324, No. 1558 (1971), pp. 301-313.

Jones, et al., "Controlled Surface-Initiated Polymerization in Aqueous Media," *Adv. Mater.*, vol. 13, No. 16 (2001), pp. 1256-121259.

Jones, et al., "In Situ forming biomaterials," *Oral Maxillofacial Surg. Clin. N. Am.*, vol. 14 (2002), pp. 29-38.

Kacher, et al., "DuraSeal MR and CT Imaging: Evaluation in a Canine Craniotomy Model."

Kahlem, et al., "Peptides containing glutamine repeats as substrates for transglutaminase-catalyzed cross-linking: Relevance to diseases of the nervous system," *Proc. Natl. Acad. Sci. USA*, vol. 93 (Dec. 1996), pp. 14580-14585.

Kellaway, et al., "Oral Mucosal Drug Delivery," in *Oral Mucosal Drug Delivery*, Rathbone (ed.). 1996, Marcel Dekkers, Inc.: New York, NY. pp. 221-239.

Kenausis, et al., "Poly(L-lysine)-g-Poly(ethylene glycol) Layers on Metal Oxide Surfaces: Attachment Mechanism and Effects on Polymer Architecture on Resistance to Protein Adsoprtion," *J. Phys. Chem. B*, vol. 104 (2000), pp. 3298-3309.

Khudyakov, et al., "Kinetics of Photopolymerization of Acrylates with Functionality of 1-6," *Ind. Eng. Chem. Res.* 38 (1999). pp. 3353-3359.

Kingshott, et al., "Effects of cloud-point grafting, chain length, and density of PEG layers on competitive adsorption of ocular proteins," *Biomaterials* 23 (2002). pp. 2043-2056.

Kirschenbaum, et al., "Sequence-specific polypeptoids: A diverse family of heteropolymers with stable secondary structure," *Proc. Natl. Acad. Sci. USA* 95 (1998). pp. 4303-4308.

Kitano, et al., "Resistance of zwitterionic telomers accumulated on metal surfaces against nonspecific adsorption of proteins," *J. Colloid Interface Sci.* 282 (2005). pp. 340-348.

Klug, et al, "In Situ Analysis of Peptidyl DOPA in Mussel Byssus Using Rotational-Echo Double-Resonance NMR," *Arch. Biochem. Biophys.*, vol. 333, No. 1 (Sep. 1, 1996), pp. 221-224.

Kolb, et al., "Click Chemistry: Diverse Chemical Function from a Few Good Reactions," *Agnew. Chem. Int. Ed.*, vol. 40 (2001), pp. 2005-2021.

Koob, et al., "Mechanical and thermal properties of novel polymerized NDGA-gelatin hydrogels," *Biomaterials*, vol. 24 (2003), pp. 1285-1292.

Korobkova, et al., "From molecular noise to behavioural variability in a single bacterium," *Nature* 428 (2004). pp. 574-578.

Kummert, et al., "The Surface Complexation of Organic Acids of Hydrous $\gamma$-$Al_2O_3$," *J. Colloid Interface Sci.*, vol. 75, No. 2 (Jun. 1980), pp. 373-385.

Laucournet, et al., "Catechol derivatives and anion adsorption onto alumina surfaces in aqueous media: influence on the electrokinetic properties," *J. Eur. Ceram. Soc.* 21 (2001). pp. 869-878.

LaVoie, et al., "Dopamine covalently modifies and functionally inactivates parkin," *Nature Med.* 11 (11), 2005. pp. 1214-1221.

Lee, et al., "Biomimetic Adhesive Polymers Based on Mussel Adhesive Proteins," in *Biological Adhesives*, Smith, et al. (eds.), Springer-Verlag: Berlin Heidelberg, 2006. pp. 257-278.

Lee, et al., "Single-Molecule Mechanics of Mussel Adhesion," *Proc. Natl. Acad. Sci. USA*, vol. 103, No. 35 (2006), pp. 12999-13003.

Lee, et al., "Bioadhesive-Based Dosage Forms: The Next Generation," *J. Pharm. Sci.* 89 (7) (2000). pp. 850-866.

Lee, et al., "Hydrogels for Tissue Engineering," *Chem. Rev.*, vol. 101, No. 7 (Jul. 2001), pp. 1869-1879.

Lemieux, et al., "Block and Graft Copolymers and Nonage™ Copolymer Networks for DNA Delivery into Cell," *J. of Drug Targeting* 8 (2), 2000. pp. 91-105.

Li, et al., "Protein Adsortion on Oligo(ethylene glycol)-Terminated Alkanethiolate Self-Assembled Monolayers: The Molecular Basis for Nonfouling Behavior," *J. Phys. Chem. B* 109 (2005). pp. 2934-2941.

Li, et al., "Copper-Based Metallization for ULSI Applications," *MRS Bulletin* 18 (6), Jun. 1993. pp. 18-21.

Li, et al., "Chemical Modifications of Surface Active Poly(ethylene oxide)—Poly(propylene oxide) Triblock Copolymers," *Bioconj. Chem.* 7 (1996). pp. 592-599.

Li, et al., "Two-Level Antibacterial Coating with Both Release-Killing and Contact-Killing Capabilities," *Langmuir* 22 (24), 2006. pp. 9820-9823.

Long, et al., "A peptide that inhibits hydroxyapatite growth is in an extended conformation on the crystal surface," *Proc. Natl. Acad. Sci. USA* 95 (1998). pp. 12083-12087.

Lorand, et al., "Transglutaminases," *Mol. Cell. Biochem.*, vol. 58 (1984), pp. 9-35.

Love, et al., "Self-Assembled Monolayers of Thiolates on Metals as a Form of Nanotechnology," *Chem. Rev.* 105 (2005). pp. 1103-1169.

Lovich, et al., "Arterial heparin despotition: role of diffusion, convection, and extravascular space," *Am. J. Phsyiol.—Heart C.*, vol. 275 (1998), pp. 2236-2242.

Lu, et al., "Studies on the synthesis and antibacterial activities of polymeric quaternary ammonium salts from dimethylaminoethyl methacrylate," *Reactive & Functional Polymers* 67 (2007). pp. 355-366.

Lucast, "Adhesive considerations for developing stick-to-skin products," *Adhesives Age* 43 (2000). pp. 36, 38-39.

Luo, et al., "Surface-Initiated Photopolymerization of Poly(ethylene glycol) Methyl Ether Methacrylate on a Diethyldithiocarbamate-Mediated Polymer Substrate," *Macromolecules*, vol. 35 (2002), pp. 2487-2493.

Lyman, et al., "Characterization of the formation of interfacially photopolymerized thin hydrogels in contact with arterial tissue," *Biomaterials* 17 (1996). pp. 359-364.

Martin, et al., "Surface Structures of a 4-Chlorocatechol Adsorbed on Titanium Dioxide," *Environ. Sci. Technol.*, vol. 30 (1996), pp. 2535-2542.

Maugh, et al., "Recombinant bioadhesive proteins of marine animals anad their use in adhesive compositions," in Genex Corp. 1988: USA. pp. 196 (1987).

Matyjaszewski, et al., "Atom Transfer Radical Polymerization," *Chem. Rev.* 101 (2001). pp. 2921-2990.

McBride, "Adsorption and Oxidation of Phenolic Compounds by Iron and Manganese Oxides," *Soil Sci. Soc. Am. J.*, vol. 51 (1987), pp. 1466-1472.

McWhitrter, et al., "Siderophore-Mediated Covalent Bonding to Metal (Oxide) Surfaces during Biofilm Initiation by *Pseudomonas aeruginosa* Bacteria," *Langmuir*, vol. 19 (2003), pp. 3575-3577.

Meisel, et al., "Estimation of calcium-binding constants of casein phosphopeptides by capillary zone electrophoresis," *Anal. Chim. Acta* 372 (1998). pp. 291-297.

Mellott, et al., "Release of protein from highly cross-linked hydrogels of poly(ethylene glycol) diacrylate fabricated by UV polymerization," *Biomaterials*, vol. 22 (2001), pp. 929-941.

Merrifield, "Solid Phase Peptide Synthesis. I. The Synthesis of a Tetrapeptide," *J. Am. Chem. Soc.*, vol. 85 (Jul. 20, 1963), pp. 2149-2154.

Merrill, "Distinctions and Correspondences among Surfaces Contacting Blood," *Annals of the NY Acad. Sci.* 516 (1987). pp. 196-203.

Miron, et al., "A Simplified Method for the Preparation of Succinimidyl Carbonate Polyethylene Glycol for Coupling to Proteins," *Bioconj. Chem.* 4 (1993). pp. 568-569.

Morgan, et al., "Biochemical characterisation of polycation-induced cytotoxicity to human vascular endothelial cells," *Journal of Cell Science* 94 (3), 1989,. pp. 553-559.

Morikawa, "Tissue sealing," *Am. J. Surg.*, vol. 182 (2001), pp. 29S-35S.

Mougin, et al., "Construction of Cell-Resistant Surfaces by Immobilization of Poly(ethylene glycol) on Gold," *Langmuir*, vol. 20 (2004), pp. 4302-4305.

Mowery, et al., "Adhesion of Thermally Reversible Gels to Solid Surfaces," *Langmuir*, vol. 13 (1997), pp. 6101-6107.

Mrksich, et al., "Using Self-Assembled Monolayers that Present Oligo(ethylene glycol) Groups to Control the Interactions of Proteins with Surfaces," *American Chemical Society Symposium Series on Chemistry and Biological Applications of Polyethylene Glycol*, vol. 680 (1997), pp. 361-373.

Mukkamala, et al., "Hydrogel Polymers from Alkylthio Acrylates for Biomedical Applications," *Polymer Gels: Fundamentals and Applciations*833 (2003). pp. 163-174.

Müller, et al., "Interaction of differentiated HL60 cells with poloxamer and poloxamine surface modified model drug carriers," *Eur. J. Phar. Sci.* 5 (1997). pp. 147-153.

Nakagawa, et al., "ENH, Containing PDZ and LIM Domains, Heart/Skeletal Muscle-Specific Protein, Associates with Cytoskeletal Proteins through the PDZ Domain," *Biocehm. Biophys. Res. Commun.* 272 (2000). pp. 505-512.

Nakayama, et al., "Newly Designed Hemostatic Technology Based on Photocurable Gelatin," *ASAIO J.*, vol. 41, No. 3 (1995), pp. M374-M378.

Nakayama, et al., "Photocurable Surgical Tissue Adhesive Glues Composed of Photoreactive Gelatin and Poly(ethylene glycol) Diacrylate," *J. Biomed. Mater. Res.*, vol. 48, Issue 4 (1999), pp. 511-521.

Nakayama, et al., "Development of high-performance stent: gelatinous photogel-coated stent that permits drug delivery and gene transfer," *J. Biomed. Mater. Res.*, vol. 57, Issue 4 (2001), pp. 559-566.

Nakonieczna, et al., "A New Convenient Route for the Synthesis of DOPA Peptides," *Liebigs Annalen der Chemie*, Issue 10 (1994). pp. 1055-1058.

Neff, et al., "A novel method for surface modification to promote cell attachment to hydrophobic substrates," *J. Biomed. Mater. Res.* 40 (1998). pp. 511-519.

Ninan, et al., "Adhesive strength of marine mussel extracts on porcine skin," *Biomaterials* 24 (2003). pp. 4091-4099.

Nishiyama, et al., "Effects of a strucutural change in collagen upon binding to conditioned dentin studied by $^{13}$C NMR," *J. Biomed. Mater. Res.*, vol. 29 (1995), pp. 107-111.

Nishiyama, et al., "Adhesion mechanisms of resin to etched dentin primed with *N*-methacryloyl glycine studied by $^{13}$C-NMR," *J. Biomed. Mater. Res.*, vol. 40 (1998). pp. 458-463.

Nishiyama, et al., "Adhesion of N-Methacryloyl-ω-Amino Acid Primers to Collagen Analyzed by $^{13}$C NMR," *J. Dent. Res.*, vol. 80, No. 3 (2001), pp. 855-859.

Northen, et al., "A batch fabricated biomimetic dry adhesive," *Nanotechnology* 16 (8), 2005. pp. 1159-1166.

Northen, et al., "Meso-scale adhesion testing of integrated micro- and nano-scale structures," *Sensors and Actuators A* 130-131 (2006). pp. 583-587.

Nyström, et al., "Dynamic Light Scattering and Rheological Studies of Thermoreversible Gelation of a Poly(ethylene oxide)-Poly(propylene oxide)-Poly(ethylene oxide) Triblock Copolymer in Aqueous Solution," *Faraday Discuss.* 101 (1995). pp. 335-344.

Nyström, et al., "Dynamic Viscoelasticity of an Aqueous System of a Poly(ethylene oxide)—Poly(propylene oxide)—Poly(ethylene oxide) Triblock Copolymer during Gelation," *J. Phys. Chem.* 100 (1996). pp. 5433-5439.

O'Keefe, et al., "Poloxamer-188 as an Adjunct to Primary Percutaneous Transluminal Coronary Angioplasty for Acute Myocardial Infarction," *Am. J. Cardiol.* 78 (1996). pp. 747-750.

Okino, et al., "In situ hydrogelation of photocurable gelatin and drug release," *J. Biomed. Mater. Res.*, vol. 59, Issue 2 (2001), pp. 233-245.

Online Medical Dictionary. "Amino acid." Available from: http//cancerweb.ncl.ac.uk/cgi-bin/omd?query=amino+acid.

Ono, et al., "Photocrosslinkable chitosan as a biological adhesive," *J. Biomed. Mater. Res.*, vol. 49, Issue 2 (1999), pp. 289-295.

Ooka, et al., "Surface-Enhanced Raman Spectroscopy of DOPA-Containing Peptides Related to Adhesive Protein of Marine Mussel, *Mytilus edulis*," *Biopolymers (Biospectroscopy)*, vol. 57, Issue 2 (2000), pp. 92-102.

Orban, et al., "Cytomimetic Biomaterials. 4. In-Situ Photopolymerization of Phospholipids on an Alkylated Surface," *Macromolecules* 33 (2000). pp. 4205-4212.

Ostuni, et al., "A Survey of Structure—Property Relationships of Surfaces that Resist the Adsorption of Protein," *Langmuir* 17 (2001). pp. 5605-5620.

Palmer, et al., "Surfactant Administration Reduces Testicular Ischemia-Reperfusion Injury," *J. Urol.* 159 (1998). pp. 2136-2139.

Pardo, et al., "Purification of Adhesive Proteins from Mussels," *Protein Expression and Purif.* 1 (2), 1990. pp. 147-150.

Parsons, "Characteristics of the amino acids as components of a peptide hormone sequence," in *Peptide Hormones*, University Park Press: 1976. pp. 1-7.

Pasche, et al., "Effects of Ionic Strength and Surface Charge on Protein Adsorption at PEGylated Surfaces," *J. Phys. Chem. B* 109 (2005). pp. 17545-17552.

Patel, et al., "Synthesis of Benzyl Esters of α-Amino Acids," *J. Org. Chem.* 30 (1965). pp. 3575-3576.

Peressadko, et al, "When Less is More: Experimental Evidence for Tenacity Enhancement by Division of Contact Area," *J. Adhes.* 80 (2004). pp. 247-261.

Perruchot, et al., "Synthesis of Well-Defined, Polymer-Grafted Silica Particles by Aqueous ATRP," *Langmuir*, vol. 17 (2001), pp. 4479-4481.

Pierpont, et al., "Transition Metal Complexes of *o*-Benzoquinone, *o*-Semiquinone, and Catecholate Ligands," *Coord. Chem. Rev.*, vol. 38 (1981), pp. 45-87.

Preul, et al., "A Unique Dual-Function Device: A Dural Sealant with Adhesion Prevention Properties."

Preul, et al., "Use of a Novel Hydrogel Sealant in a Canine Dural Repair Model," Presented at the American Association of Neurological Surgeons; Apr. 2002, Chicago, IL. Available from: http://www.confluentsurgical.com/pdf/ds/Abstract0BN_PreulAbstract.pdf.

Preul, et al., "Obtaining Watertight Closures of Duraplasty Onlay Grafts in a Craniotomy Preclinical Model," Confluent Surgical, Inc. (2005), 'White Paper.' Available from: http://www.confluentsurgical.com/pdf/LT-6000-034RevA-DuraSeal_duraplasty_study_white_paper.pdf.

Prime, et al., "Adsorption of Proteins onto Surfaces Containing End-Attached Oligo(ethylene oxide): A Model System Using Self-Assembled Monolayers," *J. Am. Chem. Soc.* 115 (1993). pp. 10714-10721.

Prucker, et al., "Polymer Layers through Self-Assembled Monolayers of Initiators," *Langmuir*, vol. 14 (1998), pp. 6893-6898.

Pyun, et al., "Synthesis of Polymer Brushes Using Atom Transfer Radical Polymerization," *Macromol. Rapid. Commun.* 24 (2003). pp. 1043-1059.

Rajh, et al., "Surface Restructuring of Nanoparticles: An Efficient Route for Ligand-Metal Oxide Crosstalk," *J. Phys. Chem. B*, vol. 106 (2002), pp. 10543-10552.

Ramakrishna, et al., "Effect of Particle Size on the Reactivity of Quantum Size ZnO Nanoparticles and Charge-Transfer Dynamics with Adsorbed Catechols," *Langmuir*, vol. 19 (2003), pp. 3006-3012.

Ranger, et al., "Pneumostasis of Experimental Air Leaks with a New Photopolymerized Synthetic Tissue Sealant," *Am. Surg.*, vol. 63, Issue 9 (1997), pp. 788-795.

Reed, et al., "A One-Step Synthesis of Monoprotected Polyethylene Glycol Ethers," *J. Org. Chem.*, vol. 65 (2000), pp. 5843-5845.

Rodriguez, et al., "Surface Complexation at the TiO$_2$ (anatase)/Aqueous Solution Interface: Chemisorption of Catechol," *J. Colloid Interface Sci.*, vol. 177 (1996), pp. 122-131.

Rodriguez-Hernández, et al., "High Branched Poly(L-lysine)," *Biomacromolecules*, vol. 4 (2003), pp. 249-258.

Ross-Murphy, "Rheological Characterization of Polymer Gels and Networks," *Polym. Gels Networks*, vol. 2 (1994), pp. 229-237.

Ruibal, et al., "The Structure of the Digital Setae of Lizards," *J. Morph.* 117 (1965). pp. 271-294.

Ryu, et al., "A Generalized Approach to the Modification of Solid Surfaces," *Science* 308 (2005). pp. 236-239.

Rzepecki, et al., "Bioadhesives: DOPA and Phenolic proteins as components of organic composite materials", *Principles of Cell Adhesion*, P.D. Richardson and M. Steiner (eds.), CRC Press, Boca Raton, FL. (1995). pp. 107-142142.

Sanborn, et al., "In situ crosslinking of a biomimetic peptide-PEG hydrogel via thermally triggered activation of factor XIII," *Biomaterials*, vol. 23 (2002), pp. 2703-2710.

Sawada, et al., "Micropatterning of Copper on a Poly(ethylene terephthalate) Substrate Modified with a Self-Assembled Monolayer," *Langmuir* 22 (2006). pp. 332-337.

Sawhney, et al., "Interfacial photopolymerization of poly(ethylene glycol)-based hydrogels upon alginate-poly(l-lysine) microcapsules for enhanced biocompatibility," *Biomaterials*, vol. 14, No. 13 (1993), pp. 1008-1016.

Sawhney, et al., "Bioerodible Hydrogels Based on Photopolymerized Poly(ethylene glycol)-*co*-poly(α-hydroxy acid) Diacrylate Macromers," *Macromolecules*, vol. 26 (1993), pp. 581-587.

Schmolka, "Articifial Skin. I. Preparation and Properties of Pluronic F-127 Gels for Treatment of Burns," *J. Biomed. Mater. Res.* 6 (6) (1972). pp. 571-582.

Schnurrer, et al., "Mucoadhesive properties of the mussel adhesive protein," *Int. J. Pharm.* 141 (1996). pp. 251-256.

Sever, et al., "Synthesis of peptides containing DOPA (3,4-dihydroxyphenylalanine)," *Tetrahedron* 57 (2001). pp. 6139-6146.

Sever, et al., "Metal-Mediated Cross-Linking in the Generation of a Marine-Mussel Adhesive," *Angew. Chem. Int. Ed.*, vol. 43 (2004), pp. 448-450.

Shull, et al., "Fracture Mechanics Studies of Adhesion in Biological Systems," *Interface Sci.*, vol. 8 (2000), pp. 95-110.

Sichel, et al., "Relationship Between Melanin Content and Superoxide Dismutase (SOD) Activity in the Liver of Various Species of Animals," *Cell Biochem. Funct.* 5 (1987). pp. 123-128.

Sierra, "Fibrin Sealant Adhesive Systems: A Review of Their Chemistry, Material Properties and Clinical Applications," *J. Biomed. Appl.*, vol. 7 (1993), pp. 309-352.

Sitti, et al., "Synthetic Gecko Foot-Hair Micro/Nano-Structures as Dry Adhesives," *J. Adhes. Sci. Technol.*, vol. 17, No. 8 (2003), pp. 1055-1073. Available from: http://nanolab.me.cmu.edu/publications/papers/Sitti-JAST2003.pdf.

Skelhorne, et al., "Hydrogel Adhesives for Wound-Care Applications," *Medical Device Technology* (Nov. 2002). pp. 19-23.

Soriaga, et al., "Determination of the Orientation of Adsorbed Molecules at Solid-Liquid Interfaces by Thin-Layer Electrochemistry: Aromatic Compounds at Platinum Electrodes," *J. Am. Chem. Soc.* 104 (1982). pp. 2735-2742.

Sousa, et al., "Human Serum Albumin Adsorption on $TiO_2$ from Single Protein Solutions and from Plasma," *Langmuir*, vol. 20 (2004), pp. 9745-9754.

Sperinde, et al., "Synthesis and Characterization of Enzymatically-Cross-Linked Poly(ethylene glycol) Hydrogels," *Macromolecules* 30 (18) (1997). pp. 5255-5264.

Sperinde, et al., "Control and Prediction of Gelation Kinetics in Enzymatically Cross-Linked Poly(ethylene glycol) Hydrogels," *Macromolecules* 33 (2000). pp. 5476-5480.

Spolenak, et al., "Adhesion design maps for bio-inspired attachment systems," *Acta. Biomater.* 1 (2005). pp. 5-13.

Spotnitz, "History of Tissue Adhesives." In: Sierra, et al. (eds.), *Surgical Adhesives and Sealants: Current Technology and Applications*. Technomic Publishing Company, Inc.: Lancaster, PA (1997). pp. 3-11.

Spotnitz, "Commercial fibrin sealants in surgical care," *Am. J. Surg.* 182 (2001). pp. 8S-14S.

Statz, et al., "New Peptidomimetic Polymers for Antifouling Surfaces," *J. Am. Chem. Soc.*, vol. 127, No. 22 (2005), pp. 7972-7973.

Stevens, "Trace bio-organic constituents of gelatins—a review," *Food Australia*, vol. 44, No. 7 (1992), pp. 320-324.

Stile, et al., "Sequential robust design methodology and X-ray photoelectron spectroscopy to analyze the grafting of hyaluronic acid to glass substrates," *J. Biomed. Mater Res.*, vol. 61, Issue 3 (2002), pp. 391-398.

Stiles, et al., "Axisymmetric Adhesion Test to Examine the Interfacial Interactions between Biologically-Modified Networks and Models of the Extracellular Matrix," *Langmuir*, vol. 19 (2003), pp. 1853-1860.

Strausberg, et al., "Protein-based medical adhesives," *Trends in Biotechnology* 8 (2) (1990). pp. 53-57.

Strausberg, et al., "Development of a microbial system for production of mussel adhesive protein." In: *Adhesives from Renewable Resources*. Hemingway, et al. (eds.), ACS Symposium Series 385, American Chemical Society, Washington, D.C. (1989). pp. 453-464.

Sugumaran, et al., "Chemical- and Cuticular Phenoloxidase-Mediated Synthesis of Cysteinyl-Catechol Adducts," *Arch. Insect Biochem. Physiol.* 11 (2) (1989). pp. 127-137.

Sugumaran, "Unified Mechanism for Sclerotization of Insect Cuticle," *Adv. Insect. Physiol.*, vol. 27 (1998), pp. 229-334.

Sun, et al., "Improved antifouling property of zwitterionic ultrafiltration membrane composed of acrylonitrile and sulfobetaine copolymer," *J. of Memr. Sci.* 285 (2006). pp. 299-305.

Sun, et al., "The Nature of the Gecko Lizard Adhesive Force," *Biophys. J.* 89 (2005). pp. L14-L16.

Swerdloff, et al., "Solid phase synthesis of bioadhesive analogue peptides with trifluoromethanesulfonic acid cleavage from PAM resin," *Int. J. Peptide Protein Res.*, vol. 33 (1989), pp. 318-327.

Taira, et al., "Analysis of Photo-iniators in Visible-light-cured Dental Composite Resins," *J. Dent. Res.*, vol. 67, No. 1 (1988), pp. 24-28.

Tan, et al., "Surface modification of nanoparticles by PEO/PPO block copolymers to minimize interactions with blood components and prolong blood circulation in rats," *Biomaterials*, vol. 14, No. 11 (1993), pp. 823-833.

Tatehata, et al., "Model Polypeptide of Mussel Adhesive Protein. I. Synthesis and Adhesive Studies of Sequential Polypeptides (X-Tyr-Lys)$_n$ and (Y-Lys)$_n$," *J. Appl. Polym. Sci.*, vol. 76, No. 6 (2000), pp. 929-937.

Taylor, et al., "Polargraphic and Spectrophotometric Investigation of Iron(III) Complexation to 3,4-Dihydroxyphenylalanine-Containing Peptides and Proteins from *Mytilus edulis*," *Inorg. Chem.*, vol. 33 (1994), pp. 5819-5824.

Taylor, et al., "*trans*-2,3-*cis*-3,4-Dihydroxyproline, a New Naturally Occurring Amino Acid, Is the Sixth Residue in the Tandemly Repeated Consensus Decapeptides of an Adhesive Protein from *Mytilus edulis*," *J. Am. Chem. Soc.*, vol. 116 (1994), pp. 10803-10804.

Taylor, et al., "Ferric Ion Complexes of a DOPA-Containing Adhesive Protein from *Mytilus edulis*," *Inorg. Chem.*, vol. 35 (1996), pp. 7572-7577.

Uyama, et al., "Surface Modification of Polymers by Grafting," *Advances in Polymer Science*, vol. 137 (1998), pp. 1-39.

Venkatraman, et al., "Skin adhesives and skin adhesion. 1. Transdermal drug delivery systems," *Biomaterials*, vol. 19 (1998), pp. 1119-1136.

Vörös, et al., "Optical grating coupler biosensors," *Biomaterials*, vol. 23 (2002), pp. 3699-3710.

Waite, "Evidence for a Repeating 3,4-Dihydroxyphenylalanine- and Hydroxyproline-containing Decapeptide in the Adhesive Protein of the Mussel, *Mytilus edulis* L.," *J. Biol. Chem.*, vol. 258, No. 5 (1983), pp. 2911-2915.

Waite, et al., "Assay of Dihdroxyphenylalanine (Dopa) in Invertebrate Structural Proteins," *Methods Enzymol.*, vol. 107 (1984), pp. 397-413.

Waite, "Adhesion à la Moule," *Integr. Comp. Biol.*, vol. 42 (2002), pp. 1172-1180.

Waite, "Mussel Beards: A Coming of Age" *Chem. Ind.* (Sep. 2, 1991), pp. 607-611.

Waite, "Nature's underwater adhesive specialist," *Int. J. Adhes. Adhes.*, vol. 7, No. 1 (1987), pp. 9-14.

Waite, "Nature's underwater adhesive specialist," *Chemtech*, vol. 17 (1987), pp. 692-697.

Waite, et al., "3,4-Dihydroxyphenylalanine in an Insoluble Shell Protein of *Mytilus edulis*," *Biochem. Biophys. Acta*, vol. 541 (1978), pp. 107-114.

Waite, et al., "Polyphosphoprotein from the Adhesive Pads of *Mytilus edulis*," *Biochemistry*, vol. 40 (2001), pp. 2887-2893.

Waite, et al., "The Bioadhesive of *Mytilus byssus*: A Protein Containing L-DOPA," *Biochem. & Biophy. Res. Comm.*, vol. 96, No. 4 (1980), pp. 1554-1561.

Waite, et al., "Mussel Adhesion: Finding the Tricks Worth Mimicking," *J. Adhes.*, vol. 81 (2005), pp. 297-317.

Waite, et al., "Polyphenolic Substance of *Mytilus edulis*: Novel Adhesive Containing L-Dopa and Hydroxyproline," *Science*, vol. 212, No. 4498 (1981), pp. 1038-1040.

Wang, et al., "Facile synthesis of well-defined water-soluble polymers via atom transfer radical polymerization in aqueous media at ambient temperature," *Chem. Commun.* (1999), pp. 1817-1818.

Wang, et al., "Facile Atom Transfer Radical Polymerization of Methoxy-Capped Oligo(ethylene glycol) Methacrylate in Aqueous Media at Ambient Temperature," *Macromolecules*, vol. 33 (2000), pp. 6640-6647.

Wanka, et al., "The aggregation behavior of poly-(oxyethylene)-poly-(oxypropylene)-poly- (oxyethylene)-block-copolymers in aqueous solution," *Cooloid. Polym. Sci.*, vol. 268 (1990), pp. 101-117.

Watanabe, et al., "Bonding durability of photocured phenyl-P In TEGDMA to smear layer-retained bovine dentin," *Quint. Int.*, vol. 24, No. 5 (1993), pp. 335-342.

Whitesides, "The origins and the future of microfluidics," *Nature*, vol. 442 (2006), pp. 368-373.

Wisniewski, et al., "Methods for reducing biosensor membrane biofouling," *Colloids Surf.*, B, vol. 18 (2000), pp. 197-219.

Yamada, "Chitosan Based Water-Resistant Adhesive. Analogy to Mussel Glue," *Biomacromolecules*, vol. 1 (2000), pp. 252-258.

Yamamoto, "Marine Adhesive Proteins and Some Biotechnological Applications," *Biotechnol. Genet. Eng. Rev.*, vol. 13 (1996), pp. 133-165.

Yamamoto, "Adhesive studies of synthetic polypeptides: A model for marine adhesive proteins," *J. Adhesion Sci. Tech.*, vol. 1, No. 2 (1987), pp. 177-183.

Yamamoto, "Synthesis and Adhesive Studies of Marine Polypeptides," *J. Chem. Soc. Perkin Trans.*, vol. 1 (1987), pp. 613-618.

Yamamoto, "Insolubilizing and adhesive studies of water-soluble synthetic model proteins," *Int. J. Biol. Macromol.*, vol. 12 (1990), pp. 305-310.

Yamamoto, et al., "Synthesis and Adhesives of Marine Adhesive Proteins of the Chilean Mussel *Aula comya ater*," *Biomimetics*, vol. 1, No. 3 (1992), pp. 219-238.

Yamamoto, et al., "Work of Adhesion of Synthetic Polypeptides Containing *L*-Lysine," *J. Colloid Interface Sci.*, vol. 156 (1993), pp. 515-517.

Yamamoto, et al., "Wettability and Adhesion of Synthetic Marine Adhesive Proteins and Related Model Compounds," *J. Colloid Interface Sci.*, vol. 176 (1995), pp. 111-116.

Yang, et al., "Physicochemical aspects of drug delivery and release from polymer-based colloids," *Curr. Opin. Colloid Interface Sci.*, vol. 5 (2000), pp. 132-143.

Young, et al., "Marine Animals and Adhesion." in: Allen (ed.), Adhesion 6. Applied Science Publishers: London and New Jersey, 1982. pp. 19-39.

Yu, et al., "Micellisation and Gelation of Triblock Copoly(oxyethylene/oxypropylene/oxyethylene), F127," *J. Chem. Soc., Faraday Trans.*, vol. 88, No. 17 (1992), pp. 2537-2544.

Yurdumakan, et al., "Synthetic gecko foot-hairs from multiwalled carbon nanotubes," *Chem. Commun.*, vol. 30 (2005), pp. 3799-3801.

Zekorn, et al., "Biocompatibility and immunology in the encapsulation of islets of Langerhans (bioartificial pancreas)," *Int. J. Artif. Organs*, vol. 19, No. 4 (1996), pp. 251-257.

Zeng, et al., "Synthesis and Characterization of DOPA-PEG Conjugates," *Polymer Preprints*, vol. 41, No. 1 (2000), pp. 989-990.

Zhan, et al., "Functionalization of Nano-Faujasite Zeolite with PEG-Grafted PMA Tethers Using Atom Transfer Radical Polymerization," *Macromolecules*, vol. 37 (2004), pp. 2748-2753.

Zhao, et al., "Polymer brushes: surface-immobilized macromolecules," *Prog. Polym. Sci.*, vol. 25 (2000), pp. 677-710.

Zuckermann, et al., "Efficient Method for the Preparation of Peptoids [Oligo(N-substituted glycines)] by Submonomer Solid-Phase Synthesis," *J. Am. Chem. Soc.*, vol. 114 (1992), pp. 10646-10647.

\* cited by examiner

MODIFIED ACRYLIC BLOCK COPOLYMERS FOR HYDROGELS AND PRESSURE SENSITIVE WET ADHESIVES

CROSS-REFERENCE TO RELATED APPLICATIONS

Reference is made and the priority date of provisional patent application 60/773,910, filed Feb. 16, 2006, is claimed herein. The disclosure of the 60/773,910 application is also incorporated by reference herein.

STATEMENT REGARDING FEDERALLY SPONSORED RESEARCH OR DEVELOPMENT

This invention was made with government support under Grant No. R01 DE014193 awarded by the National Institutes of Health and Grant No. DMR 0214146 awarded by the National Science Foundation. The government has certain rights in the invention.

BACKGROUND OF THE INVENTION

There is a growing demand for bioadhesives that can be easily delivered and that solidify in situ to form strong and durable interfacial adhesive bonds and are resistant to the normally detrimental effects of water. Some of the potential applications for such biomaterials include consumer adhesives, bandage adhesives, tissue adhesives, bonding agents for implants, and drug delivery. It is also preferable to prepare these adhesives in a toxicologically acceptable solvent that enables injection to the desired site and permits a conformal matching of the desired geometry at the application site.

BRIEF SUMMARY OF THE INVENTION

Briefly, in one aspect, the present invention addresses, in part, the above demand with a modified acrylic block, especially triblock, copolymer system, which can be fully dissolved in toxicologically acceptable organic solvents. In this approach, hydrophilic and hydrophobic lower alkyl methacrylate copolymer "blocks" are chosen or are created so that hydrogels can be formed by a solvent exchange mechanism when a solution of the block copolymer in an acceptable solvent is exposed to water that is naturally present within the body and gels. By this process in situ formation of a bioadhesive in an aqueous environment is accomplished. "Lower alkyl" will be understood by one skilled in this art generally to mean having about 1 to 6 carbon atoms and being predominantly but not necessarily exclusively hydrocarbon in nature. Preferred lower alkyl moieties herein are methyl and tert-butyl.

In one embodiment of this invention poly(methyl methacrylate-tert-butyl methacrylate-methyl methacrylate) (PMMA-PtBMA-PMMA) triblock copolymer is synthesized by anionic polymerization. The PtBMA midblock is then converted to hydrophilic poly-methacrylic acid (PMAA).

In a further embodiment of this invention, the above block (co)-polymers were modified with L-3,4-dihydroxyphenylalanine (DOPA), a modified amino acid that is believed to be responsible for wet adhesion in mussel adhesive proteins. The preferred triblock polymer, so modified, was fully dissolved in N-methyl pyrrolidone (NMP), dimethyl sulfoxide (DMSO), or dimethylformamide (DMF), and hydrogels were formed by exposing the solutions to saturated water vapor.

It is significant to note that the preferred PtBMA, after conversion to pMAA, noted above has the advantage of being easily modified to have other functional groups such as —$NH_2$, —OH. The —COOH and —OH derivatives are particularly preferred because they permit ester bond or linkages to be formed, e.g., to a drug or other agent or species. Hydrolysis of the ester linkages provides, for example, drug or agent release. It will also be appreciated by one skilled in the art that the preferred pMAA can be reacted with many compounds in addition to the DOPA disclosed herein.

Monomers other than tBMA can certainly be used to create the hydrophilic mid-block, whether in a protected or unprotected configuration. Protecting groups such as carbobenzyloxy (Cbz) and tert-butylmethylsilyl (TBDMS) are well known protecting groups for —$NH_2$ and —OH, respectively. 2-methylallylamine and 2-methyllyl alcohol are possible substitutes for tBMA.

One skilled in the art will appreciate that this invention involves the steps of inducing gel formation by solvent exchange in a multi-block co-polymer having two or more "blocks." The copolymer blocks are selected for their hydrophobicity/hydrophilicity to produce gels. The blocks are also selected, or modified, to incorporate specific and specified functional groups chosen to control, primarily to enhance, adhesive interactions. Specific embodiments of the invention disclosed herein should not be used narrowly to interpret the more general scope of this invention.

BRIEF DESCRIPTION OF THE DRAWINGS

The present invention will now be illustrated, in its preferred practice, by the description below. The attached claims should not be narrowly construed in view of the disclosure hereof and of the attached figures in which:

FIG. 5($a$) is a schematic drawing of the sample geometry and ($b$) is a drawing of the adhesion testing apparatus as used with this invention. The punch radius is $a_0$ and "h" is the thickness of the elastic layer.

DETAILED DESCRIPTION OF THE INVENTION AND EXAMPLES

Triblock Copolymer Synthesis

Materials

Methyl methacrylate (MMA) and tert-butyl methacrylate (tBMA) were purified by addition of triethylaluminum (AlEt$_3$, Aldrich) solution in hexane until a persistent yellowish color was observed. After degassing by freezing in liquid nitrogen (−78° C.), tBMA was distilled under reduced pressure and stored in freezer whereas MMA was distilled directly into the reaction chamber prior to polymerization. Diphenylethylene (DPE, Aldrich) was purified by addition on sec-butyllithium (s-BuLi, Aldrich) until a persistent green color was observed. The solution was stirred under nitrogen overnight, and distilled under reduced atmosphere after degassing, and stored in the freezer. Difunctional initiator was prepared by the reaction of Li and Naphthalene (both as received) in distilled THF at room temperature for 24 hrs under nitrogen atmosphere. As Li reacts with Naphthalene, the color of the solution became dark green. LiCl was dried in the reaction chamber at 130° C. under vacuum overnight. Sodium (dispersion in Paraffin) and benzophenone were added to the THF, and refluxed until a persistent purple color was observed.

Anionic Triblock Copolymer Synthesis (Rxn 1)

Anionic polymerization of tBMA and MMA (FIG. 1) was carried out under a nitrogen atmosphere by using a difunctional initiator. THF was distilled into the reaction chamber and stirred for 30 minutes to dissolve the LiCl. The concentration of initiator was determined by titration of the green initiator solution with a known amount of acetanilide in distilled THF prior to addition. The chamber was then cooled with a MeOH/dry ice bath, and the THF solution was titrated by adding a few drops of initiator until a faint green color was observed. The calculated volume of initiator was added, and a dark green color was observed immediately. After addition of the DPE, the green color immediately turned into a deep red. The deep red color immediately disappeared when the tBMA was introduced dropwise into the reaction flask. The polymerization was allowed to proceed at −78° C. for 2 hours.

A small sample was taken by using a steel needle just before MMA transfer in order to determine the molecular weight of the tBMA block. MMA was then distilled into the reaction chamber, and the solution was stirred for 1 h before termination with anhydrous MeOH. The final solution was concentrated and precipitated into methanol-water (90:10) mixture under stirring. The polymer was dried under vacuum overnight.

Figure 1:
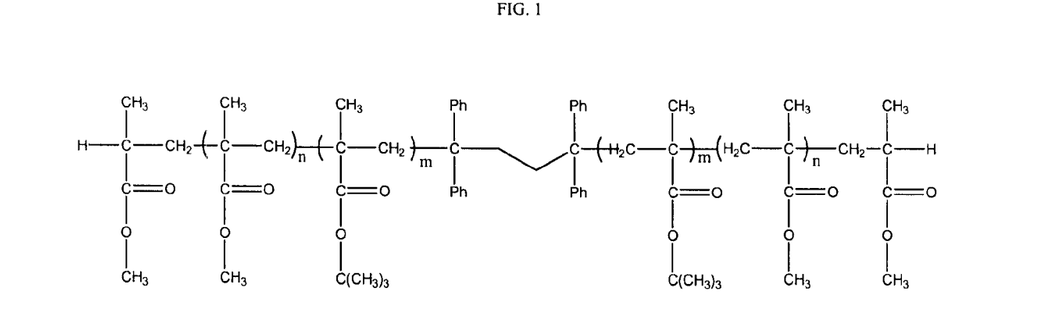
FIG. 1 is a chemical structure of synthesized PMMA-PTBMA-PMMA triblock copolymer obtained by anionic polymerization with sequential monomer addition using a difunctional initiator.

The total molecular weight of the polymer as determined by GPC was 120,000 g/mole with a polydispersity index of 1.08. The molecular weight of the midblock was 80,000 g/mole. The chemical structure of this triblock copolymer is shown in FIG. 1.

Conversion of Midblock into Methacrylic Acid

Figure 2:
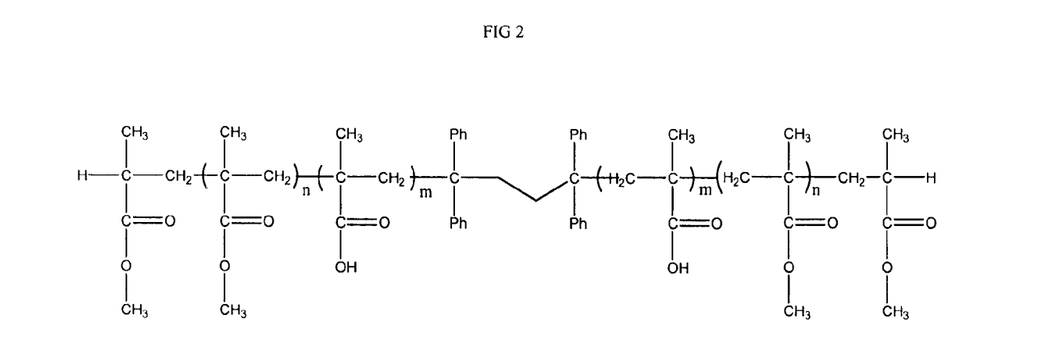
FIG. 2 is the chemical structure of a converted acrylic triblock polymer (i.e., to PMMA-PMAA-PMMA) such as that shown in FIG. 1.

PMMA-PtBMA-PMMA triblock copolymer was completely dissolved in dioxane, and hydrolyzed with hydrochloric acid at 80° C. for 6 hrs. The colorless solution became yellowish with time. The solution was precipitated in hexane, and the polymer was washed with hexane and water several times before it was dried under vacuum overnight. After conversion $^1$H NMR showed that the t-C(CH3)$_3$ signal (at 1.43 ppm) had completely disappeared, indicating that the conversion was complete, giving the polymer structure shown in FIG. 2.

Figure 3:
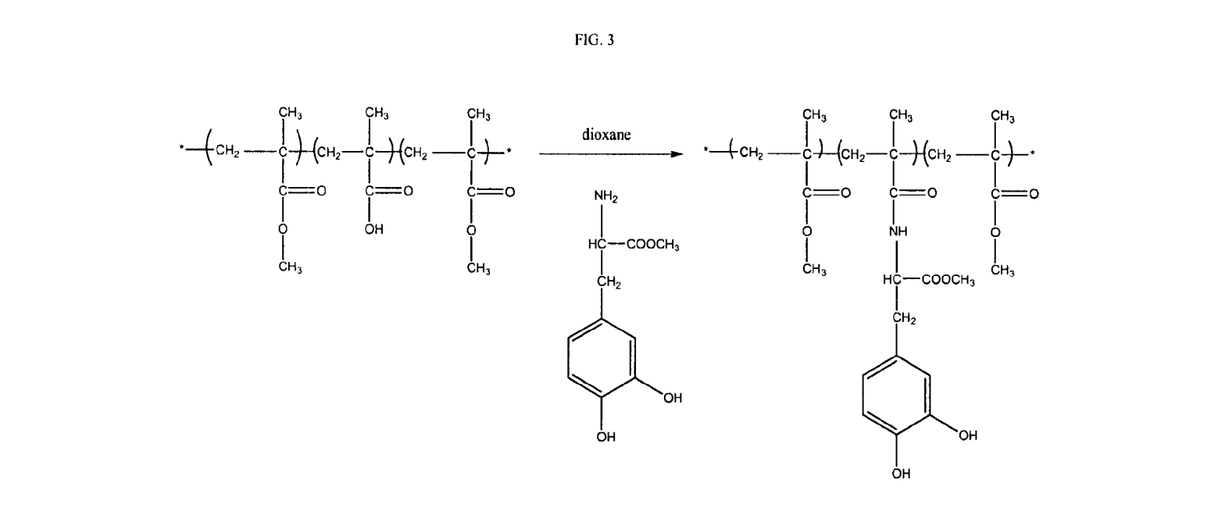
FIG. 3 is the chemical structure of DOPA modified PMMA-PMAA-PMMA.

The PMMA-PMAA-PMMA triblock copolymer synthesized above was completely dissolved in DMF. DOPA methyl ester (DME), 1-hydroxybenzotriazole hydrate (HOBT) and o-benzotriazole-N,N,N$_i^1$,N$_i^1$-tetramethyl-uronium-hexafluoro-phosphate (HBTU) were dissolved in DMF in separate vials and added into the triblock solution in the written sequential order. The reaction was completed after the addition of triethylamine (Et$_3$N). All reactions were carried out under nitrogen atmosphere to give the DOPA-containing polymers shown in FIG. 3. The hydrogel-forming experiments described below were performed on polymers that do not contain DOPA.

Hydrogel Formation and Characterization

Bulk Gel Properties (Characterization)

Figure 4:
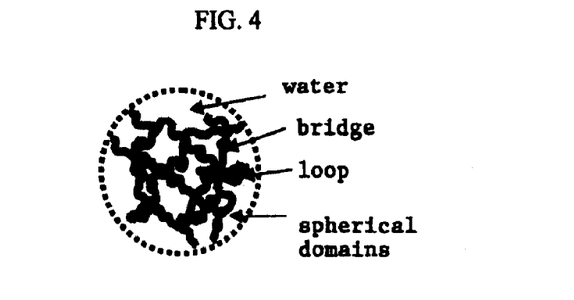
FIG. 4 illustrates the assumed molecular structure of the resulting gel.

The triblock copolymer was dissolved in a solvent that is a good solvent for both mid- and end-blocks. The solution was poured into a circular washer which was attached to a glass slide. Then it was exposed to a saturated water environment for a sufficient period of time to enable water diffusion into the solution. As water diffuses into the solution and the original solvent diffuses out, the hydrophobic end-blocks aggregate and form spherical domains. The hydrophilic mid-block forms bridges between these domains, and also loops, as shown schematically in FIG. 4. FIG. 4 is a picture of a hydrogel after equilibration with a saturated water environment (left) and the assumed molecular structure of the gel (right).

Axisymmetric Adhesion Tests

Figure 5A:
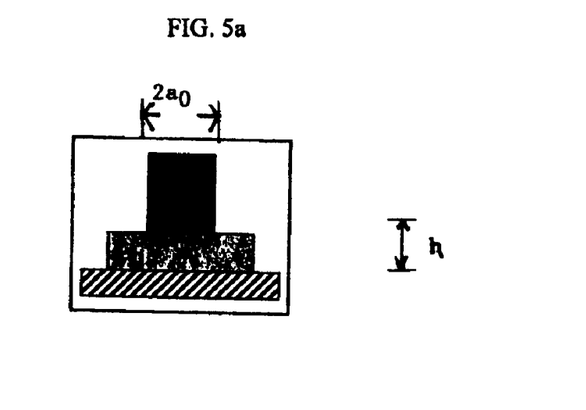
Figure 5B:
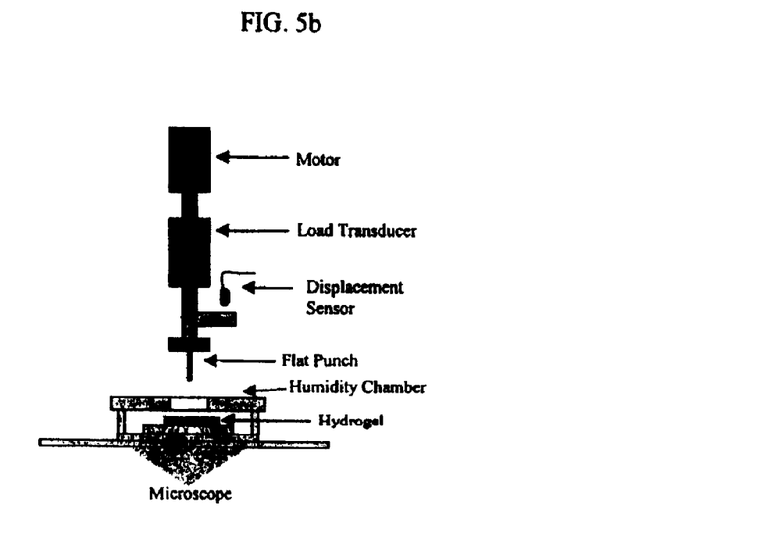

The experimental setup utilized for adhesion experiments and determination of the elastic moduls is shown schematically FIG. 5. A flat punch is driven by an inchworm motor and is attached to a 50 g load transducer. A fiber optic displacement sensor is used to measure displacement of the punch. FIG. 5 is a schematic drawing of (a) the sample geometry and (b) the adhesion testing apparatus. Note that a, is the punch radius and b is the thickness of the elastic layer.

The geometry of the mechanical test provides a well defined contact radius that corresponds to the punch radius, a. Young's modulus of the gel, E, is determined from the relationship between the load, P and the displacement, δ, utilizing the following expression.

$$E = \frac{3P}{8a\delta}\left[1 + 1.33\left(\frac{a}{h}\right) + 1.33\left(\frac{a}{h}\right)^3\right]^{-1}$$

The energy release rate (G) can be calculated from the following equation:

$$G = \frac{3(P_t)^2}{32\pi E a^3}$$

where $P_t$ is the measured tensile load.

The frequency-dependent dynamic moduli are measured by applying a sinusoidally varying displacement to the sample.

Figure 6:
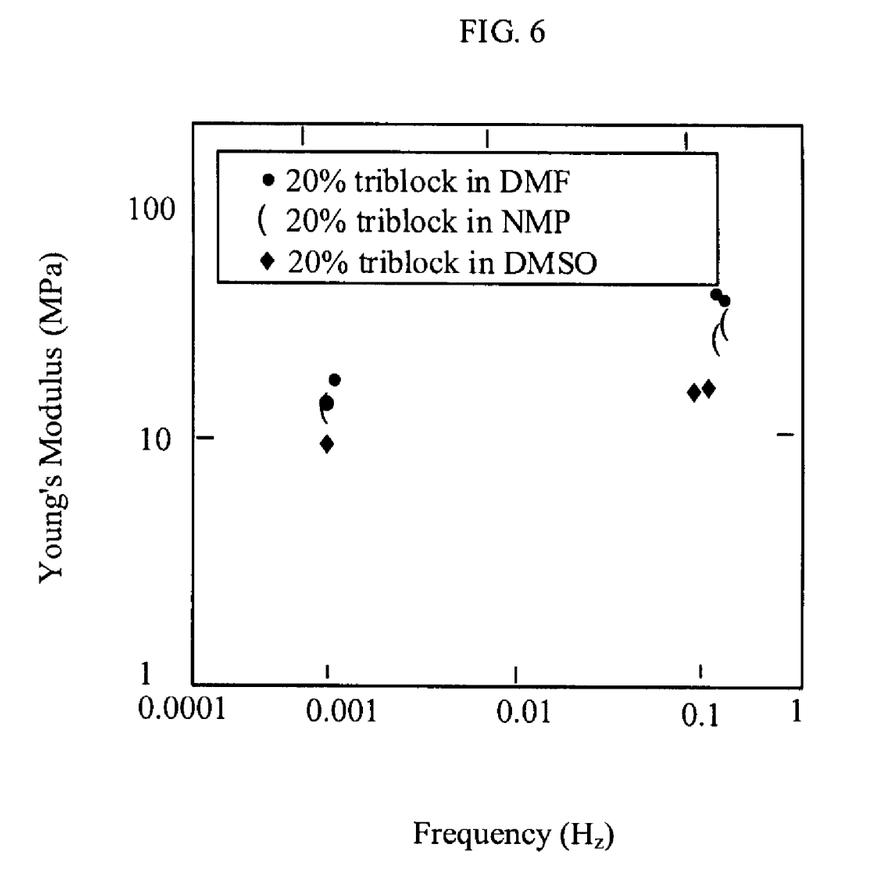
FIG. 6 is a plot of frequency (Hertz, Hz) vs. Young's Modulus (Mega Pascal's-MPa) for triblock copolymers of this invention comprising 20% in DMF, NMP, and DMSO, as shown.

Measured values of the elastic modulus are plotted in FIG. 6. Gels were prepared as described before, and exposed to humidity in a closed environment until the size and elastic properties of the gels no longer changed with time (typically 3 days). The moduli range from 10 to 30 MPa, depending on the initial solvent that was used. FIG. 6 shows the magnitude of the complex Young's modulus at different frequencies for hydrogels that were formed from the triblock formed in 20% solution of DMF, NMP and DMSO. Equilibrated gel thicknesses were around 2 mm.

Figure 7:
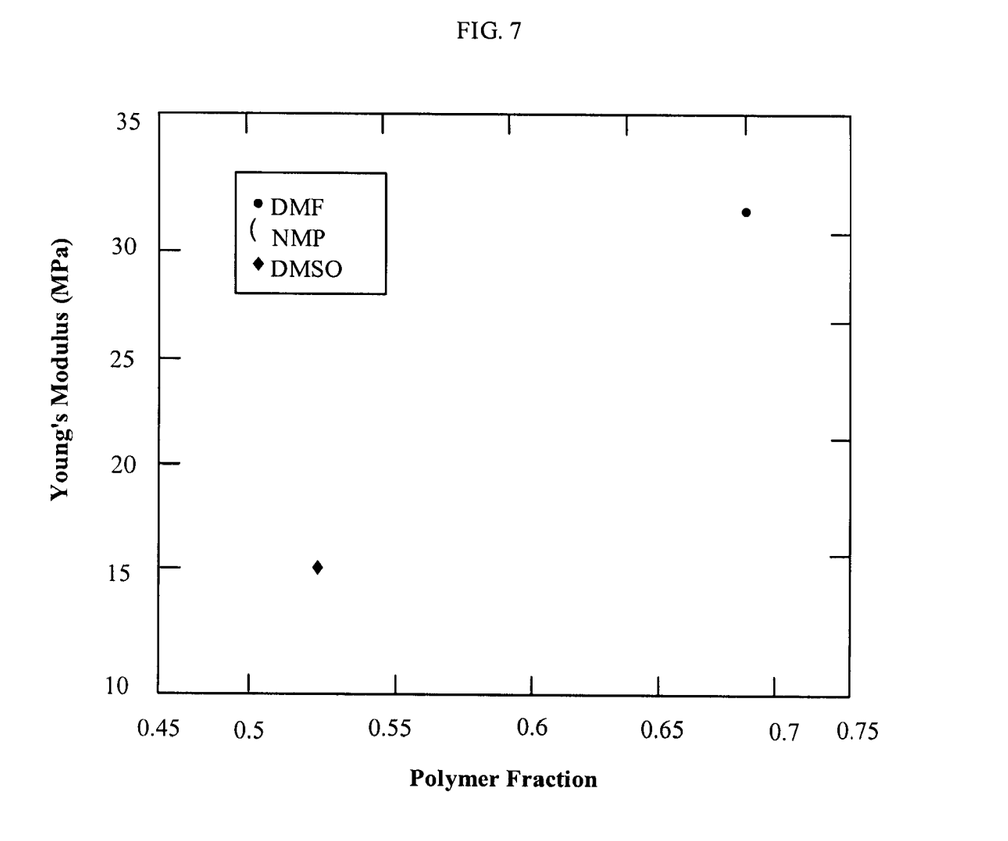
FIG. 7 is a plot of polymer fraction vs. Young's Modulus in the same solvents used in FIG. 6.

The relation between elastic modulus and equilibrium polymer concentrations of the hydrogels is given in FIG. 7. It is clear that elastic modulus increases with increasing polymer concentration, and that the final polymer concentration depends on the solvent in which the triblock copolymer was originally dissolved. FIG. 7 shows Young's Modulus at 0.1 Hz plotted against final polymer concentration after equilibration with saturated water vapor.

Figure 8:
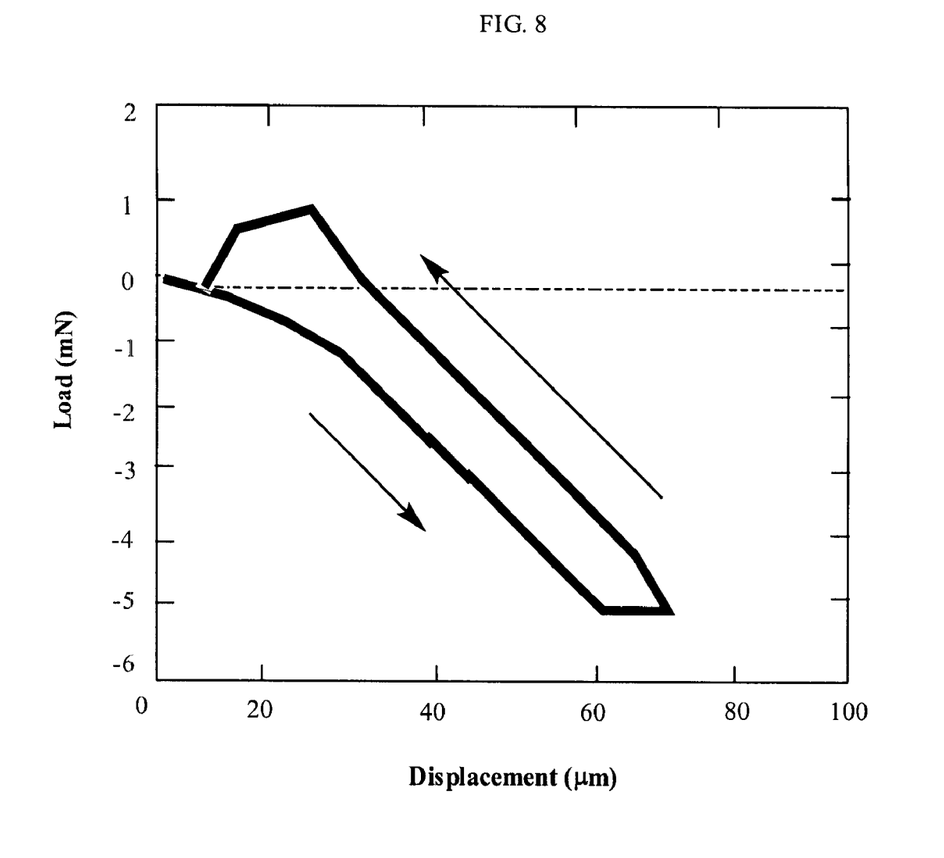
FIG. 8 is a load vs. displacement plot for a hydrogel after equilibration with a saturated water environment; a hyrdogel of 20% tricopolymer block solution in DMSO.
Figure 9:
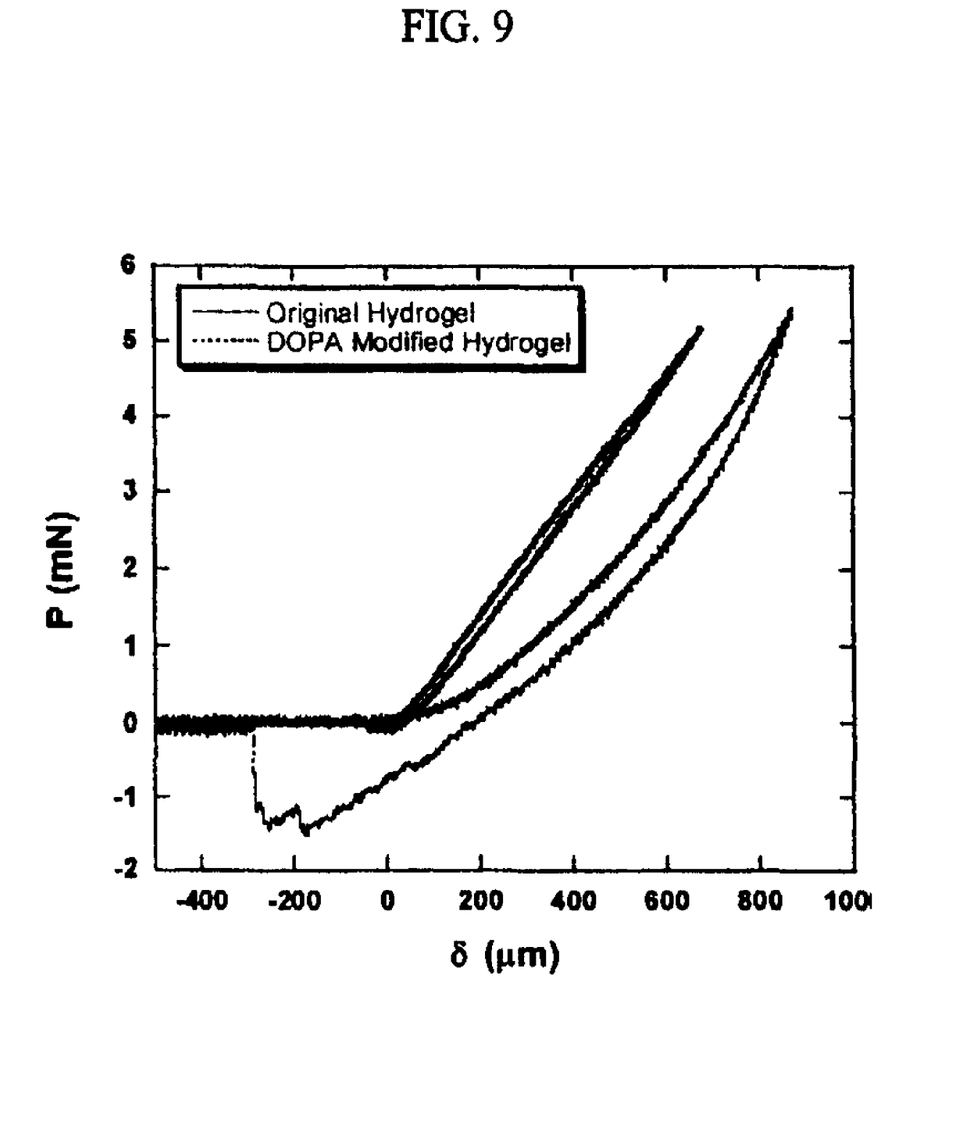
FIG. 9 load-displacement curves of original PMMA-PMAA-PMMA and DOPA-modified hydrogels contracting $TiO_2$ coated surface in controlled buffer.

Preliminary adhesion experiments were also performed by using a steel punch having a radius of 0.39 mm. A load-displacement plot for a sample prepared from DMSO is shown in FIG. 8. The punch was brought into contact with the gel, and a maximum compressive load of 5 mN was applied for 5 minutes. A tensile force was observed when the punch was then retracted from the gel, indicating that there is some adhesion between the steel punch and the hydrogel, even in the absence of DOPA.

FIG. 8 is a load-displacement curve for hydrogel after equilibration with a saturated water environment. The hydrogel was formed from a 20% solution of the triblock copolymer in DMSO.

PMMA-PMAA-PMMA triblock copolymers can be completely dissolved in toxicologically acceptable solvents such as NMP, EtOH and DMSO, as well as other solvents such as MeOH and DMF. Hydrogels are formed by a simple solvent exchange mechanism, during exposure of polymer solutions to water vapor. The elastic moduli are relatively high (~15-30 MPa), which is consistent with the relatively high polymer volume fractions in the gel after the solvent exchange process is completed.

DOPA-modified hydrogels were prepared in the same manner from DMSO solutions of DOPA-modified copolymer. The gel obtained after solvent exchange was de-swollen and opaque, and did not swell at all when immersed in neutral water. This behavior is attributed to the relatively hydrophobic character of the DOPA moieties in the midblock. In order to obtain swollen gels, they were immersed in pH10 buffer solutions after solvent exchange. The gel swelled, became a transparent red, and then became a deep red, which is an indication of DOPA oxidation. The modulus of the swollen DOPA-hydrogel was found to be 1.3 kPa by indentation method.

Axisymmetric Adhesion Tests

Adhesion of DOPA-modified hydrogel in contact with $TiO_2$ was measured with the indentation method. A flat punch coated with $TiO_2$ was brought into contact with the hydrogel, and a maximum compressive load of 5 mN was applied. The load was retracted until the surfaces were separated. Contact curves of PMMA-PMAA-PMMA hydrogel (without DOPA) show very little hysteresis, as shown in FIG. 5. On the other hand, a significant negative load (tensile load, Pt) was developed when the $TiO_2$-coated punch was retracted from the gel, an indication of adhesion between hydrogel surface and the metal oxide surface. For the DOPA modified hydrogel we calculate a critical energy release rate, Gc of $\approx$27 $mJ/m^2$, from the maximum tensile load at pulloff. Young's modulus (E) of the gels was obtained from the slope of advancing portion of load displacement data, according to Eq. 2. Results are summarized in Table 1 (below).

In this study a polymer system was developed that was intended to mimic mussel adhesive proteins, and was capable of self assembling into an adhesive hydrogel when injected into an aqueous environment. DOPA modified PMMA-PMAA-PMMA triblock copolymers described in this study are potential candidates for in situ gel forming bioadhesive materials suitable for tissue repair and regeneration.

Table 1 properties of gels initially prepared from DMSO solution, and equilibrated in controlled buffer (pH=10). Φin and Φp are the respective polymer concentrations of the initial solution prior to solvent exchange, and the swollen gel equilibrated in buffer solution.

| Hydrogel | Φin | Φp | E (kPa) | G (mJ/m²) |
|---|---|---|---|---|
| Original | 0.1 | 0.01 | 1.6 | - |
| DOPA Modified | 0.2 | 0.05 | 2.6 | 27 |

Highly swollen hydrogels were formed for pH values greater than 4, with G≈1 kPa. This is attributed to ionization of the methacrylic acid mid-blocks. At neutral pH the gels formed from the triblock with high DOPA content were stiffer, and opaque. A transparent red gel was obtained by immersing the preformed gel in pH=10 buffer. The red color is an indication of DOPA oxidation. These DOPA modified hydrogels had a modulus of 2.6 kPa. The presence of oxidized DOPA significantly increased the adhesion to $TiO_2$ surfaces that had been immersed in water.

Figure 10:
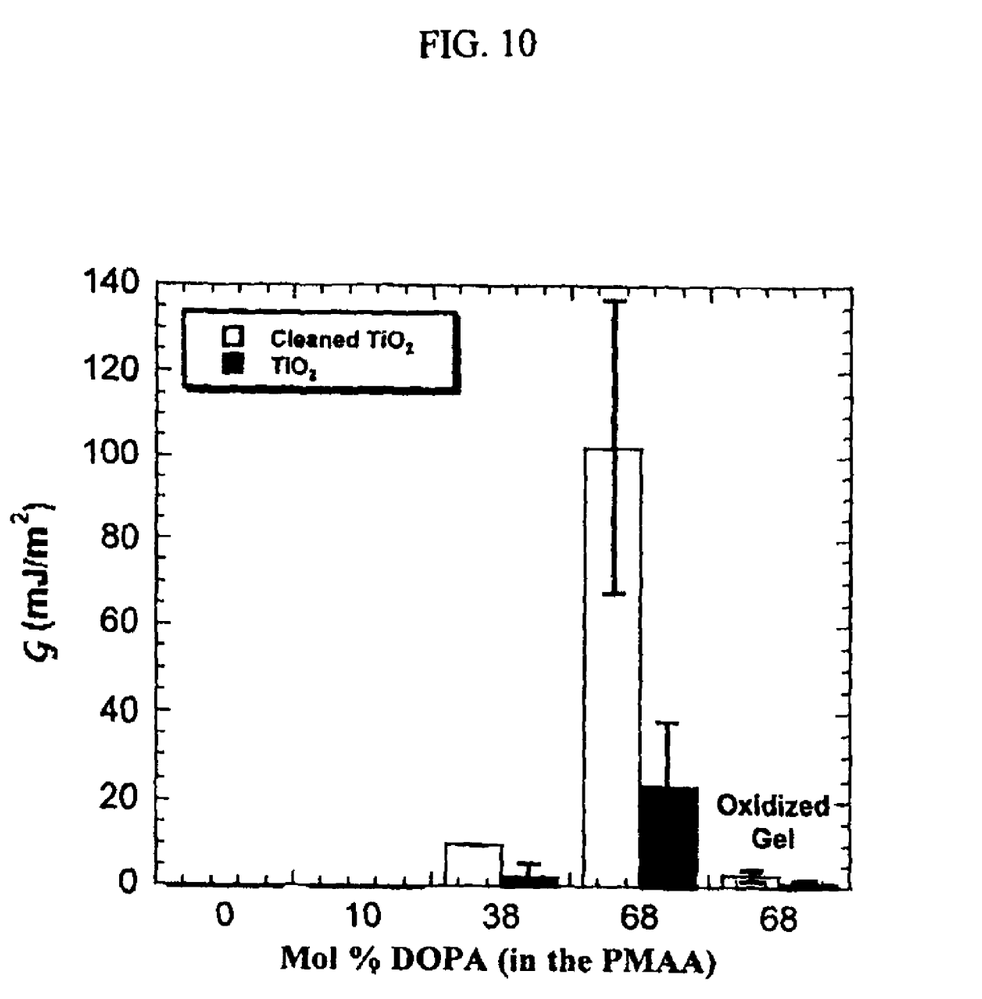
FIG. 10 illustrates adhesion of DOPA-modified hydrogels submerged in water to UV-ozone cleaned (white) or untreated (black) TiO$_2$ surfaces. The oxidized hydrogels were submerged within a pH 10 solution for four days prior to adhesion experiment.

FIG. 10 shows the amount of energy required to separate the DOPA-modified hydrogels from wetted $TiO_2$ surfaces. The adhesion energy increased with increasing DOPA content in the block copolymer on both UV-ozone treated and untreated $TiO_2$ surfaces. This experiment also demonstrated that the unoxidized form of DOPA is responsible for the water-resistant adhesion as the adhesive strength of the oxidized hydrogels was reduced by over 20 fold.

REFERENCES INCORPORATED HEREIN BY REFERENCE

The following publications are incorporated by reference herein:

Guvendiren, Murat; Lee, Bruce P.; Messersmith, Phillip B.; Shull, Kenneth R. Synthesis and adhesion properties of DOPA incorporated acrylic triblock hydrogels. Proceedings of the Annual Meeting of the Adhesion Society (2006), 29th 277-279.

Guvendiren, Murat; Messersmith, Phillip B.; Shull, Kenneth R. Adhesion in Self-Assembled Hydrogels with High DOPA Content. Proceedings of the Annual Meeting of the Adhesion Society (2007), 30th.

Tae G., Kornfield J. A., Hubbel J. A., *Biomaterials*, 2005, 26, 5259-5266.

Yu M., Hwang J., and Deming T. J., *J. Am Chem. Soc*, 1999, 121, 5825-5826.

Shull K. R., *Mat. Sci. Eng.*, 2002, R36, 1-45.

Webber R. E., et al., *Physical Review E*, 2003, 68, 021805.

Crosby A. J., et al., J. Rheology, 2002, 46, 273.

"Alpha, Beta-Dehydro-3,4-Dihydroxyphenylalanine Derivatives—Potential Schlerotization Intermediates in Natural Composite-Materials", Rzepecki, L. M., Nagafuchi, T., and Waite, J. H., *Arch. Biochem. Biophys.* 1991, 285, 17-26.

"Hydroxyarginine-Containing Polyphenolic Proteins in the Adhesive Plaques of the Marine Mussel Mytilus-Edulis", Papov, V. V., Diamond, T. V., Biemann, K., and Waite, J. H., *J. Biol. Chem.* 1995, 270, 20183-92.

"Wresting the muscle from mussel beards: Research and applications", Rzepecki, L. M. and Waite, J. H., *Mol. Mar. Biol. Biotechnol.* 1995, 4, 313-22.

Waite, J. H., in *Redox-Active Amino Acids in Biology,* 1995, Vol. 258, p. 1-20.

"Enzymatic tempering of a mussel adhesive protein film", Hansen, D. C., Corcoran, S. G., and Waite, J. H., *Langmuir* 1998, 14, 1139-47.

"Mytilus edulis adhesive protein (MAP) as an enzyme immobilization matrix in the fabrication of enzyme-based electrodes", Saby, C. and Luong, J. H. T., *Electroanalysis* 1998, 10, 1193-9.

"Synthetic polypeptide mimics of marine adhesives", Yu, M. E. and Deming, T. J., *Macromolecules* 1998, 31, 4739-45.

"Mussel byssus and biomolecular materials", Deming, T. J., *Current Opinion In Chemical Biology* 1999, 3, 100-5.

"Expression of multiple forms of an adhesive plaque protein in an individual mussel, Mytilus edulis", Warner, S. C. and Waite, J. H., *Mar. Biol.* 1999, 134, 729-34.

"Synthesis and characterization of self-assembling block copolymers containing adhesive moieties", Huang, K., Lee, B., and Messersmith, P. B., *Polym. Prepr. (Am. Chem. Soc., Div. Polym. Chem.)* 2001, 42, 147-8.

"Enzymatic and non-enzymatic pathways to formation of DOPA-modified PEG hydrogels", Lee, B. P., Dalsin, J. L., and Messersmith, P. B., *Polym. Prepr. (Am. Chem. Soc., Div. Polym. Chem.)* 2001, 42, 151-2.

"Synthesis of 3,4-dihydroxyphenylalanine (DOPA) containing monomers and their co-polymerization with PEG-diacrylate to form hydrogels", Lee, B. P., Huang, K., Nunalee, N., Shull, K. R., and Messersmith, P. B., *J. Biomater. Sci. Polymer Ed.* 2004, 15, 449-64.

E. Ruel-Gariepy and J. -C. Leroux, *European Journal of Pharmaceutics and Biopharmaceutics,* 2004, 58, 409-426.

S. Dai, P. Ravi, K. C. Tam, B. W. Mao and L. H. Gan, *Langmuir,* 2003, 19, 5175-5177.

A. Rozier, C. Mazuel, J. Grove and B. Plazonnet, *International Journal of Pharmaceutics,* 1989, 57, 163-168.

G. Tae, J. A. Kornfield and J. A. Hubbell, *Biomaterials,* 2005, 26, 5259-5266.

B. P. Lee, C. -Y. Chao, F. N. Nunalee, E. Motan, K. R. Shull and P. B. Messersmith, *Macromolecules,* 2006, 39, 1740-1748.

B. P. Lee, J. L. Dalsin and P. B. Messersmith, *Biomacromolecules,* 2002, 3, 1038-1047.

What is claimed is:

1. A method to prepare an amide of a methacrylic block copolymer, comprising the step:
   reacting an anionically polymerized block copolymer of methyl methacrylate-methacrylic acid-methyl methacrylate (MMA-MAA-MMA), with a 3,4-dihydroxyphenyl alanine (DOPA) to provide an amide of the block copolymer.

2. The method of claim 1, wherein the MAA segment of the block copolymer MMA-MAA-MMA is a hydrolysis product of a sterically hindered ester of methacrylic acid.

3. The method of claim 2, wherein the sterically hindered ester of methacrylic acid is t-butyl methacrylate.

4. The method of claim 3, wherein the block copolymer comprising the sterically hindered ester of methacrylic acid is polymerized anionically with a difunctional initiator.

5. The method of claim 4, wherein the difunctional initiator is an anion product of the two diphenylethylene molecules.

6. The method of claim 1, wherein the anionically polymerized block copolymer of (MMA-MAA-MMA) is a hydrolysis product of methyl methacrylate-t-butyl methacrylate (tBMA)-methyl methacrylate (MMA-tBMA-MMA).

7. The method of claim 6, wherein the block copolymer (MMA-tBMA-MMA) is polymerized anionically with a difunctional initiator.

8. The method of claim 7, wherein the difunctional initiator is an anion product of two diphenylethylene molecules.

* * * * *